United States Patent
Rotfogel et al.

(10) Patent No.: US 12,508,282 B2
(45) Date of Patent: Dec. 30, 2025

(54) MITOCHONDRIAL TRANSPLANTATION AND USE THEREOF IN OCULAR DISEASES

(71) Applicant: Mor Research Applications Ltd., Ramat-Gan (IL)

(72) Inventors: Ziv Rotfogel, Ramat Gan (IL); Keren Ben-Yaakov, Ramat Gan (IL); Michal Simon, Ramat Gan (IL); Avital Eisenberg-Lerner, Ramat Gan (IL)

(73) Assignee: MOR RESEARCH APPLICATIONS LTD., Ramat Gan (IL)

( * ) Notice: Subject to any disclaimer, the term of this patent is extended or adjusted under 35 U.S.C. 154(b) by 321 days.

(21) Appl. No.: 18/364,319

(22) Filed: Aug. 2, 2023

(65) Prior Publication Data

US 2023/0390332 A1 Dec. 7, 2023

Related U.S. Application Data

(63) Continuation-in-part of application No. 17/594,141, filed as application No. PCT/IB2020/053216 on Apr. 3, 2020.

(60) Provisional application No. 62/828,704, filed on Apr. 3, 2019.

(51) Int. Cl.
*A61P 27/02* (2006.01)
*A61K 35/12* (2015.01)

(52) U.S. Cl.
CPC ............... *A61K 35/12* (2013.01); *A61P 27/02* (2018.01)

(58) Field of Classification Search
CPC .................................................... A61P 27/02
See application file for complete search history.

(56) References Cited

U.S. PATENT DOCUMENTS

2014/0193511 A1 7/2014 Yivgi-Ohana et al.
2018/0071337 A1 3/2018 Cataldo et al.

FOREIGN PATENT DOCUMENTS

| WO | WO-2008137035 A1 * | 11/2008 | ................ A61P 9/00 |
| WO | 2017124037 A1 | 7/2017 | |
| WO | 2020021535 A1 | 1/2020 | |

OTHER PUBLICATIONS

Bergen N.J.V et al., "Mitochondrial Disorders and the Eye." Eye and Brain, Nov. 26, 2011, vol. 3, pp. 29-47.
International Search Report and Written Opinion of Application No. PCT/IB2020/053216 mailed Jul. 6, 2020, 11 Pages.
Nascimento-Dos-Santos G., et al., "Neuroprotection from Optic Nerve Injury and Modulation of Oxidative Metabolism by Transplantation of Active Mitochondria to the Retina." Biochemical Biophysica Acta (BBA)—Molecular Basis of Disease, May 1, 2020, vol. 1866(5), pp. 165686.
Rotfogel Z., et al., Abstract only, "Therapeutic Potential of Mitochondrial Transplantation in Ocular Diseases." Investigative Ophthalmology & Visual Science, Jun. 2020, vol. 61, pp. 317-317.

* cited by examiner

*Primary Examiner* — Qiuwen Mi
(74) *Attorney, Agent, or Firm* — FISHERBROYLES, LLP; Roger L. Browdy

(57) ABSTRACT

Methods for treatment of cornea epithelium pathologies and conditions, which may benefit from treatment of mitochondrial dysfunction, mitochondrial destruction and/or mitochondrial depletion in the eye, are disclosed. These methods comprise the transplantation of viable exogenous, isolated mitochondria to the cornea, for example, by topical application of designated eyedrops.

12 Claims, 18 Drawing Sheets
(16 of 18 Drawing Sheet(s) Filed in Color)

Fig. 9A
Fig. 9B
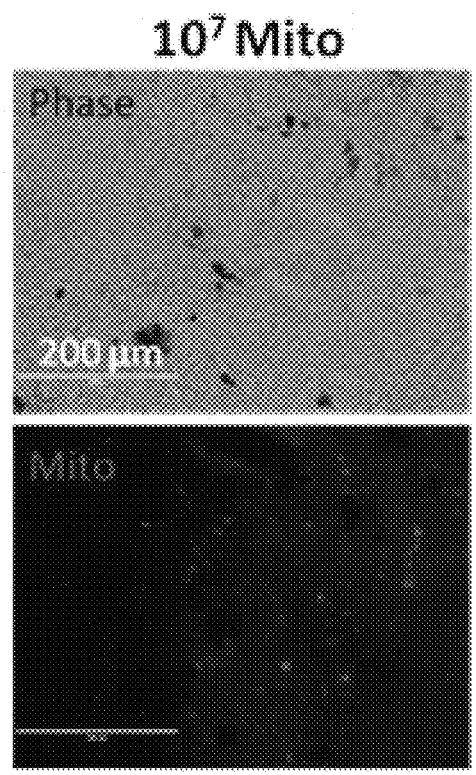
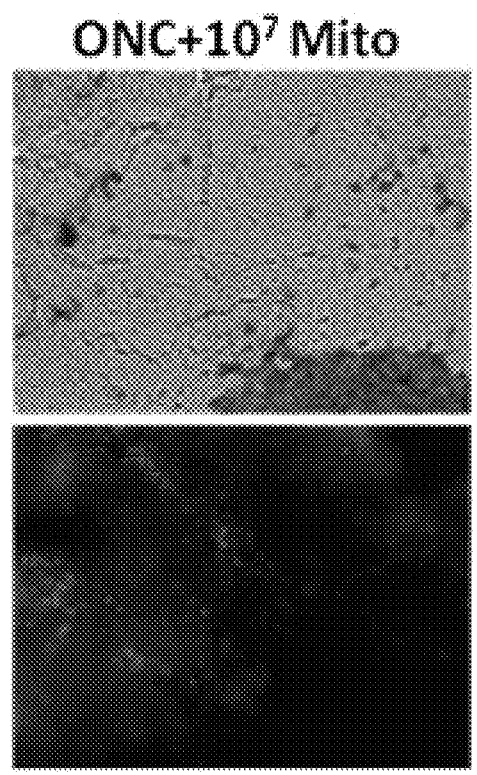

Untreated

ONC

ONC+10$^7$Mito

MITOCHONDRIAL TRANSPLANTATION AND USE THEREOF IN OCULAR DISEASES

FIELD OF THE INVENTION

The present disclosure relates to mitochondrial transplantation, particularly, but not exclusively, to ocular mitochondrial transplantation, for treatment of ocular diseases, disorders and conditions associated with mitochondrial dysfunction.

BACKGROUND

Located in the cell cytoplasm, mitochondria are known as the powerhouse of the cell, as they produce most of the cell's energy in the form of adenosine triphosphate (ATP), while simultaneously producing a small and manageable amount of harmful oxidative agents known as reactive oxygen species (ROS). Human mitochondria have a special circular, double-stranded genome (mtDNA) that encodes for 13 proteins essential for the function of the oxidative phosphorylation system, which is composed of four respiratory-chain complexes (complexes I-IV) and ATP synthase.

Besides their indispensable role in ATP production, mitochondria also participate in other processes including iron metabolism, calcium homeostasis, heme synthesis, steroid biosynthesis and oxidant/antioxidant (redox) balance. When mitochondrial function is impaired, an oxidative stress may occur, e.g., due to increased production of ROS, which, in turn, may lead to damage in DNA, proteins and lipids in the cell, decreased production of ATP and activation of signaling pathways that may eventually lead to cell death.

Mitochondrial dysfunction has been established in the pathogenesis of many conditions such as, but not limited to, aging, Parkinson's disease, Alzheimer's disease, diabetes and some psychiatric diseases. Genetic mitochondrial diseases are related to mutations in the mtDNA or mutated mitochondrial proteins encoded by the nucleus. In fact, apart from classic mitochondrial diseases, there is evidence for mitochondrial dysfunction in almost all known diseases. For example, mitochondrial dysfunction has been shown to contribute to the pathogenesis of ischemic and traumatic insults, for example, in cardiac infarctions, stroke, traumatic brain injury and spinal cord injury. Mitochondrial dysfunction may also be mediated by environmental factors.

The visual system is one of the highest energy-depending and demanding systems. It is, therefore, highly susceptible to impaired energy supply caused by mitochondrial dysfunction. Indeed, ocular manifestation is a prominent clinical feature of, e.g., various genetic mitochondrial disorders. Oxidative stress-induced mtDNA mutations and otherwise mitochondrial dysfunction have been shown to contribute to the progression of common sight-threatening conditions such as glaucoma, age-related macular degeneration (AMD), diabetic retinopathy and ocular ischemic insults. Several reports have suggested that mitochondria dysfunction/impairment contributes to acute and chronic ischemia-induced retinal ganglion cells (RGCs) death in central retinal artery occlusion, ischemic optic neuropathy and acute angle closure glaucoma. Since ocular ischemic insults are highly prevalent, yet still untreatable, new therapeutic modalities are an unmet need.

Mitochondrial transplantation is a therapeutic strategy attempted for treatment of ischemic insults in the heart, liver and nervous system. In this treatment modality, mitochondria isolated from a healthy tissue, in vitro, are injected into damaged tissue. Injection of isolated mitochondria into the damaged, e.g., ischemic tissue, results in the internalization of the mitochondria by the distressed cells and protects them from cell death. It is speculated that a fresh reservoir of healthy mitochondria decreases ROS production within the cell, provides a new pool of intact, exogenous mtDNA and increases energy production and calcium buffering capacity. The internalized exogenous mitochondria may also provide the cell with enough energy for mitophagy of damaged mitochondria (a form of mitochondria-specific targeted autophagy), that also contributes to cell survival.

SUMMARY

One aspect of the present disclosure relates to methods for treating various ocular pathologies related to, or associated with, mitochondrial dysfunction, mitochondrial destruction and/or depletion in the eye of a subject, whereby a therapeutically effective amount of isolated, exogenous mitochondria are delivered to the diseased eyes of the subject. In some embodiments, a disclosed method is directed to the treatment of an ocular manifestation of a systemic disease, disorder or condition associated with mitochondrial dysfunction. Systemic diseases which may have ocular manifestation include, for example, congenital, vascular, neoplastic, autoimmune, idiopathic, infectious, metabolic/endocrine or hypertension diseases. A disorder or condition that may have ocular manifestation is, for example, trauma, drugs usage and/or exposure to toxins.

In some embodiments, a disclosed method is directed to the treatment of an ophthalmic disease, disorder or condition associated with mitochondrial dysfunction in a subject, such as, but not limited to, an ocular sequelae of a primary mitochondrial disease (resulting, e.g., from direct impairment of mitochondrial functions by mutations in nuclear DNA and/or mitochondrial DNA), aging, environmental factors, an injury to the eye, or a secondary mitochondrial dysfunction disease. Non-limiting examples of ophthalmic diseases that may by treated by a disclosed method include dominant optic atrophy (DOA), Leber hereditary optic neuropathy (LHON), chronic progressive external ophthalmoplegia (CPEO), pigmentary retinopathy, Kearns-Sayre syndrome (KSS), corneal clouding, diabetic retinopathy, glaucoma, age-related macular degeneration (AMD), proliferative vitreo-retinopathy (PVR), and Fuchs dystrophy.

In some embodiments, a disclosed method is directed to the treatment of an ocular ischemic insult in a subject, for example, retinal ischemic insult. Exemplary ischemic optic neuropathies that may be treated by a disclosed method include, e.g., non-arteritic anterior ischemic optic neuropathy (NAION) and central retinal artery occlusion (CRAO).

A disclosed method is further directed to the treatment of mechanical injuries, chemical injuries and/or dystrophies in the eye that may be alleviated or mitigated by mitochondrial replenishment and/or replacement. In some embodiments, treatment of a damaged or injured corneal epithelial layer is effected by mitochondrial transplantation.

Damage to the cornea epithelium may be caused by one or more of: a medicament, injury, a corrosive agent, exposure to a chemical or toxin, corneal abrasion, dry eye, a corneal dystrophy involving erosion, a neurotrophic disease causing incomplete lid closure, trichiasis, distichiasis, a restrictive eyelid disease, proptosis/exophthalmos, blepharoplasty, an ultraviolet burn, limbal stem cell deficiency, topical anesthetic abuse, neurotrophic keratopathy and infection. For example, chemical injuries may result, e.g., from exposure to a variety of substances such as acids, alkalis, and other toxins and corrosive agents. Alkali injuries, which are more common, may be caused by exposure to hazardous alkali such as sodium hydroxide (NaOH) that may significantly damage the eye, particularly the cornea.

Mitochondrial dysfunction is characterized, for example, by inadequate number of mitochondria, a dysfunction in mitochondria electron transport and ATP-synthesis machinery.

In some embodiments, treatment is effected by transplantation of isolated mitochondria. The transplanted mitochondria may be autologous, allogeneic, syngeneic or xenogeneic mitochondria.

In some embodiments, the transplanted mitochondria are freshly isolated mitochondria.

Mitochondria, in accordance with a disclosed method, may be transplanted via a rout selected from direct injection or microinjection, topical application and/or systemic delivery. In some embodiments, mitochondria are administered directly to the eye, e.g., into ocular tissues, for example, by injection to one or more of: the vitreous, cornea, an ocular-muscle, the anterior chamber, or the suprachoroidal space. In some embodiments, mitochondria are topically applied to the surface of the eye (for example, by designated eye drops). In exemplary embodiments, the mitochondria are injected intravitreally.

In another aspect, the present disclosure relates to a formulation comprising a therapeutically effective amount of isolated mitochondria and a pharmaceutically acceptable carrier, for use in the treatment of mitochondrial dysfunction, mitochondrial destruction or depletion in the eye of a subject, and a disease, disorder or condition associated therewith. Diseases, disorders or conditions associated with mitochondrial dysfunction, mitochondrial destruction or depletion include, but are not limited to, ocular manifestation of systemic diseases or disorders, ophthalmic diseases, disorders or conditions, an ocular ischemic insult in a subject or chemical injuries.

In some embodiments, a disclosed formulation comprises fresh mitochondria.

In yet another aspect, the present disclosure relates to a kit comprising (a) isolated mitochondria or a formulation comprising same; (b) means to administer the isolated mitochondria to a subject in need thereof; and optionally (c) written instructions.

In some embodiments, a contemplated kit comprises freshly isolated mitochondria.

Further embodiments and the full scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the invention will become apparent to those skilled in the art from this detailed description.

BRIEF DESCRIPTION OF THE FIGURES

The patent or application file contains at least one drawing executed in color. Copies of this patent or patent application publication with color drawings will be provided by the Office upon request and payment of the necessary fee.

Some embodiments of the present disclosure are herein described, by way of example only, with reference to the accompanying drawings. With specific reference now to the drawings in detail, it is stressed that the particulars shown are by way of example and for purposes of illustrative discussion of embodiments disclosed herein. In this regard, the description taken with the drawings makes apparent to those skilled in the art how embodiments described herein may be practiced.

In the drawings:

Figure 1A:
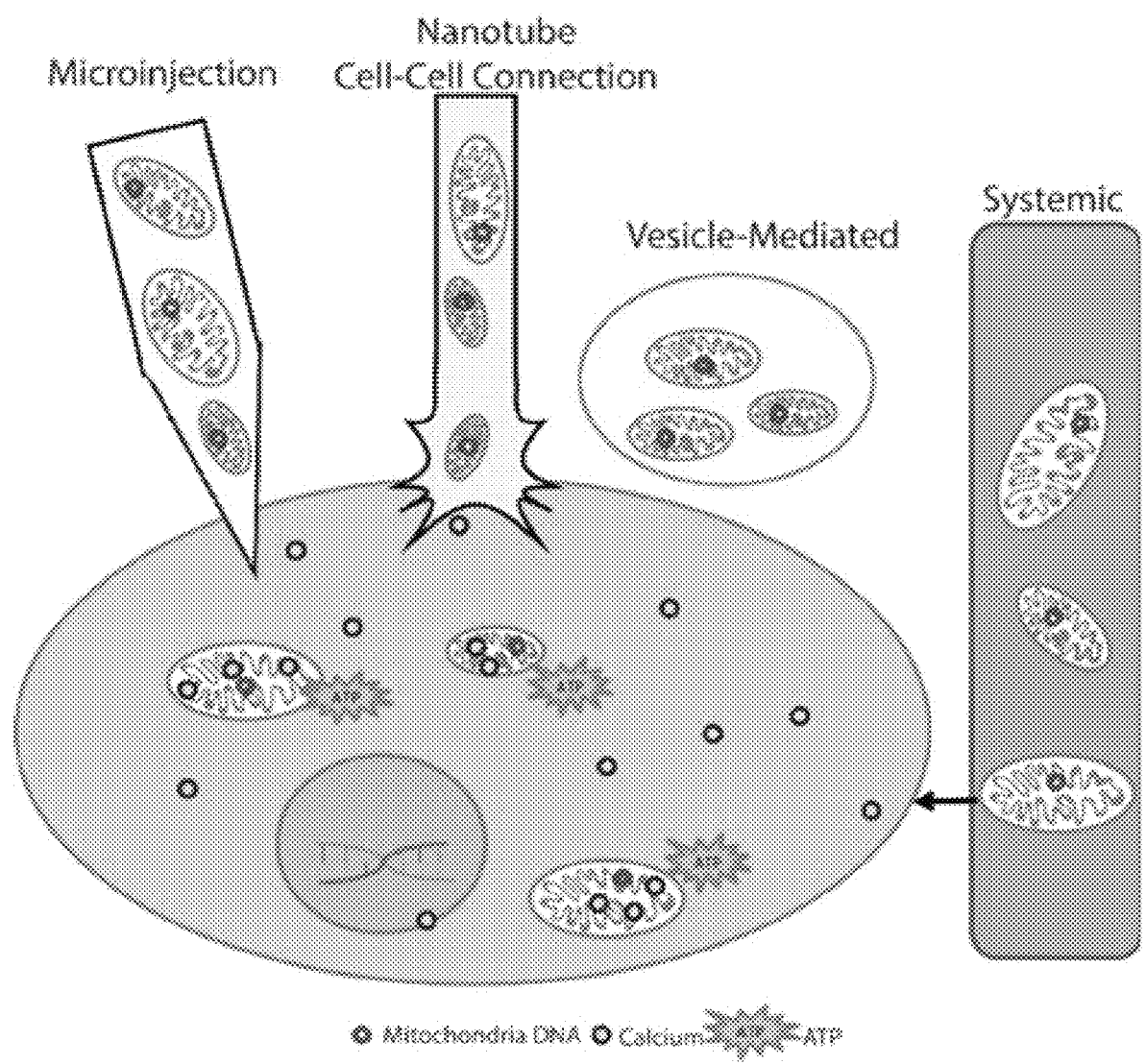
Figure 1B:
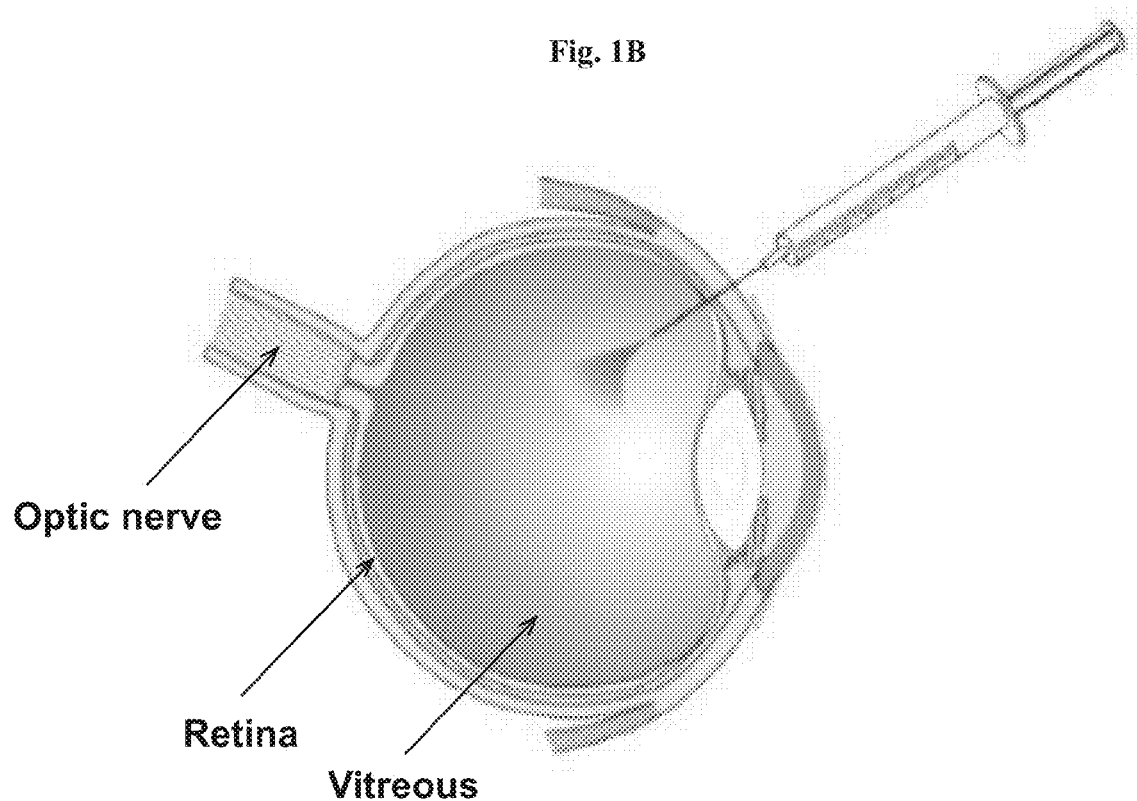
Figure 1C:
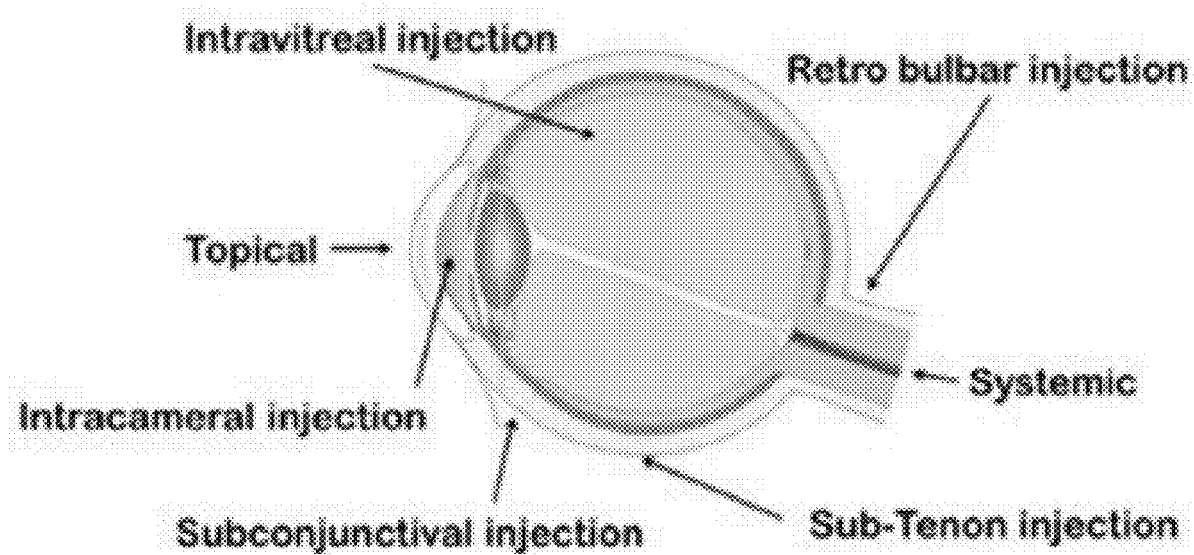
Figure 2A:
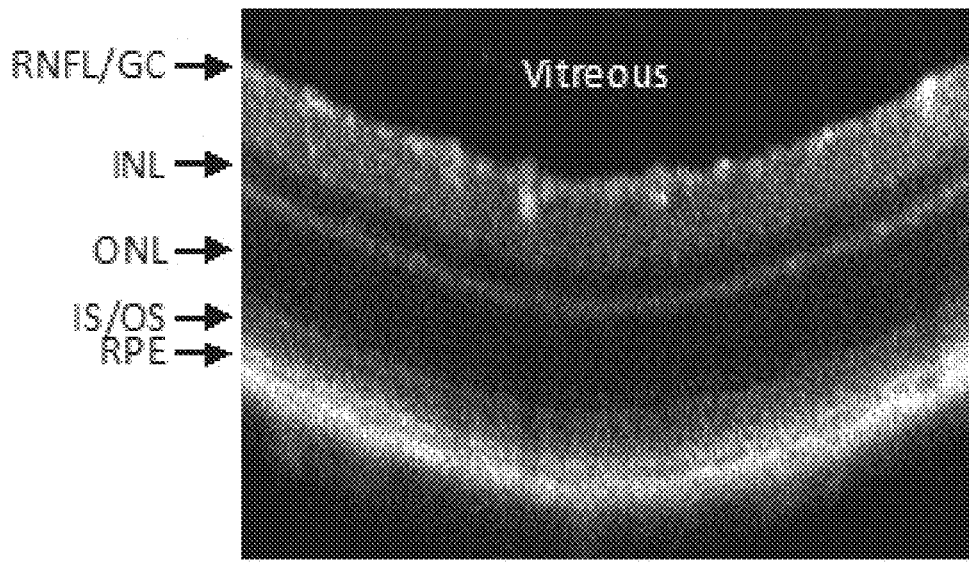
Figure 2B:
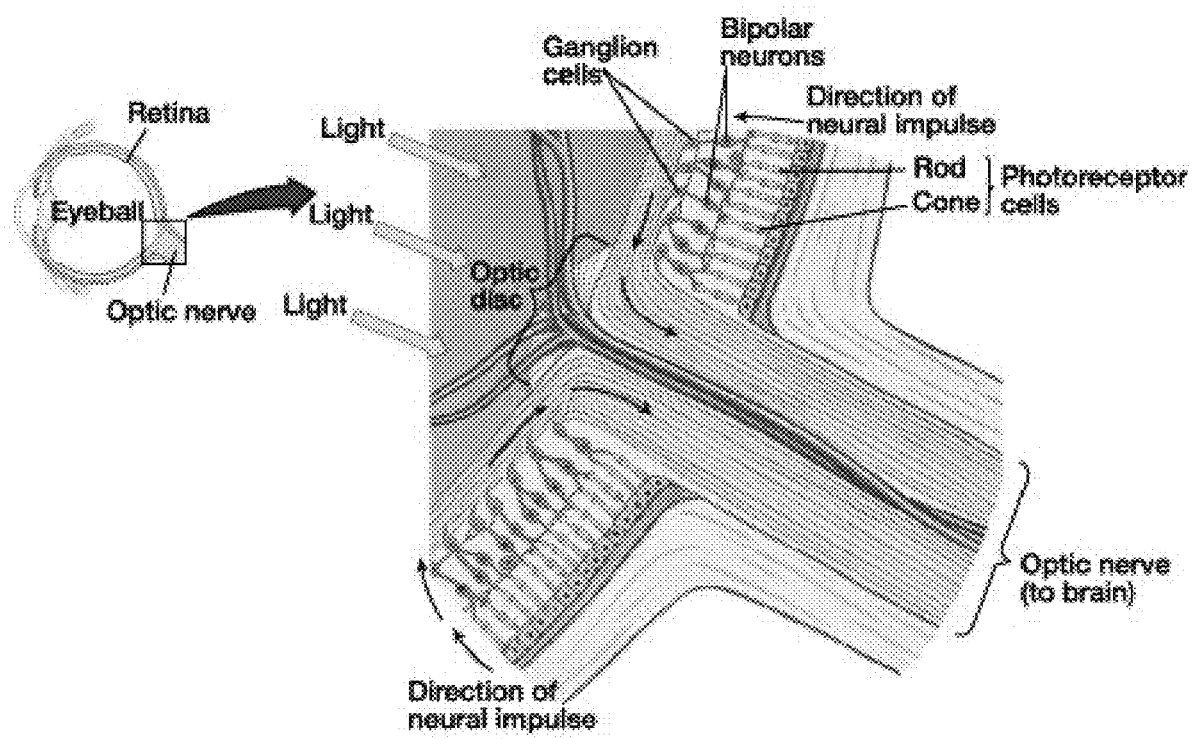
Figure 3A:
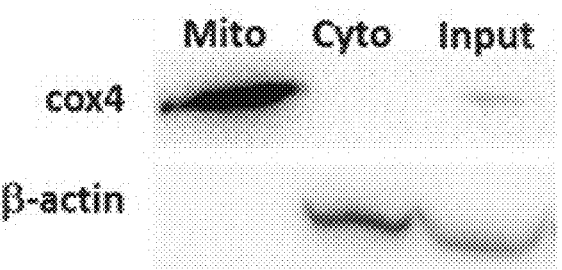
Figure 3B:
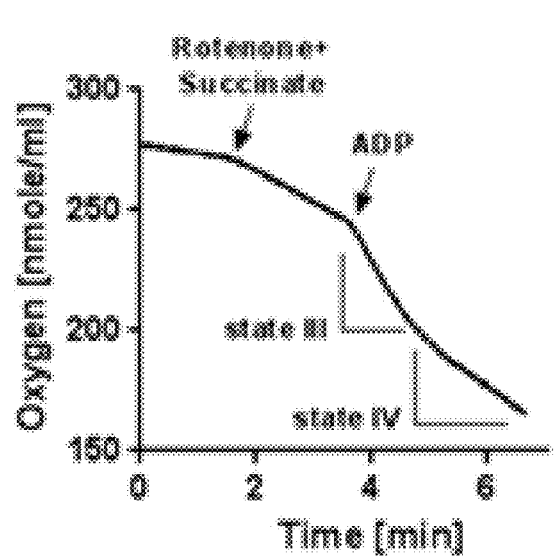
Figure 3C:
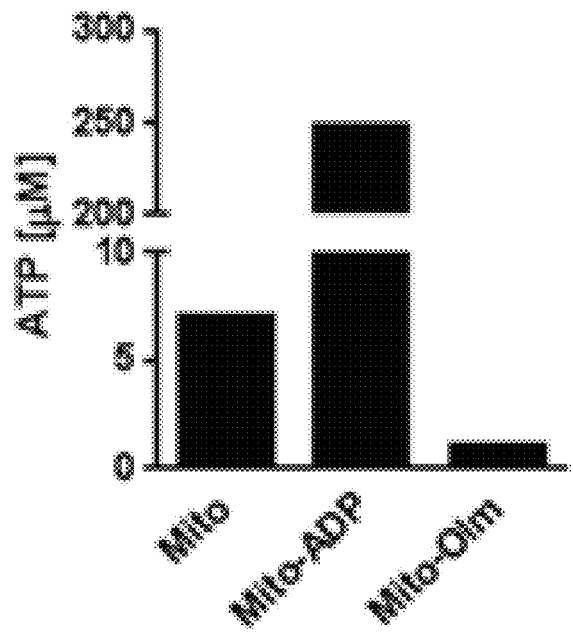
Figure 3D:
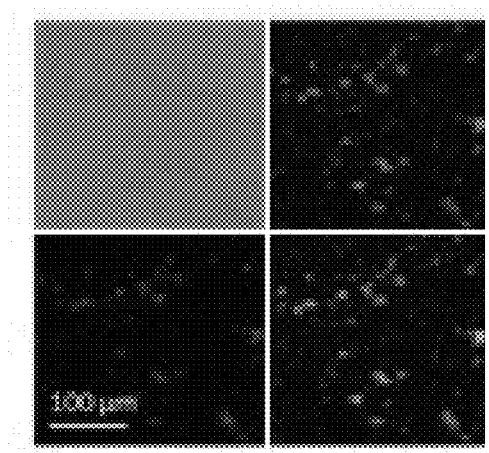
Figure 4A:
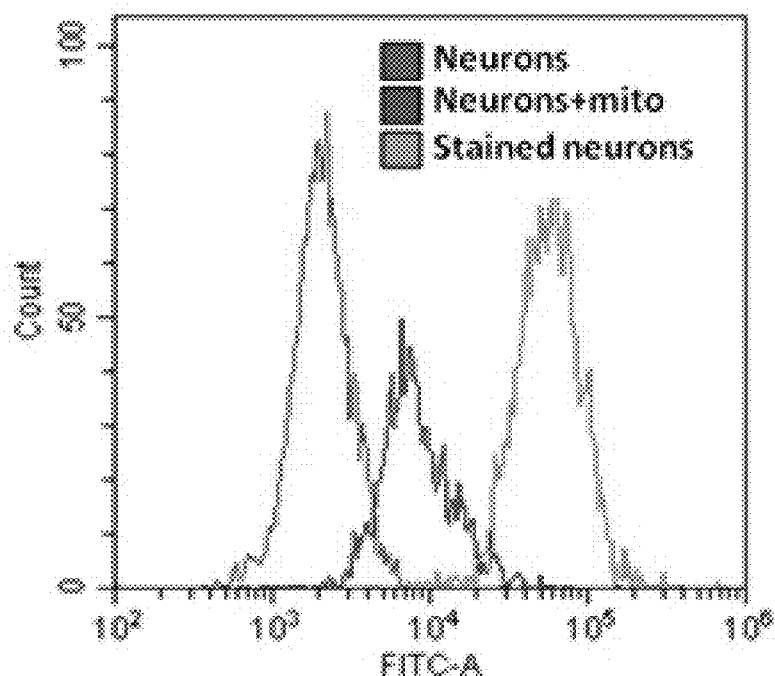
Figure 4B:
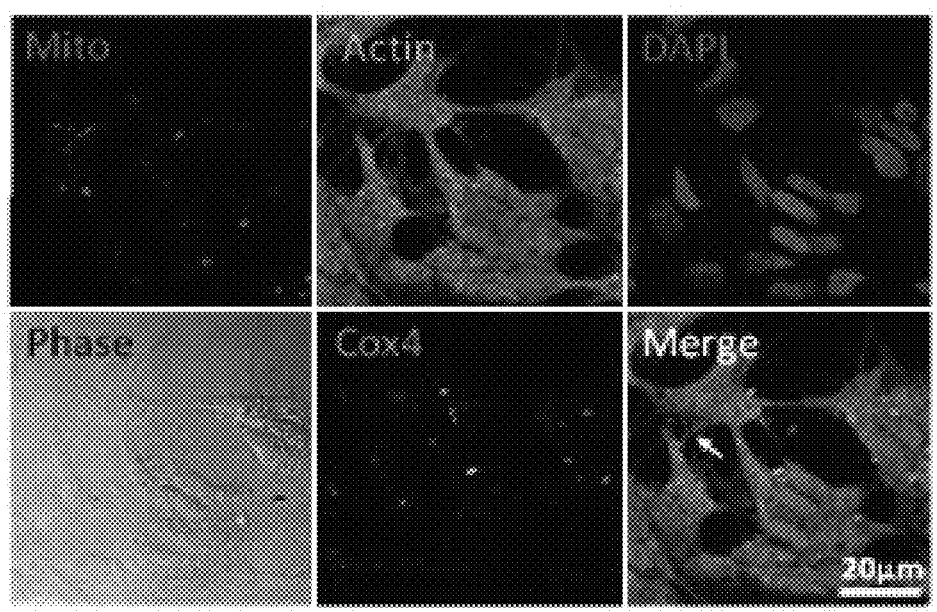
Figure 4C:
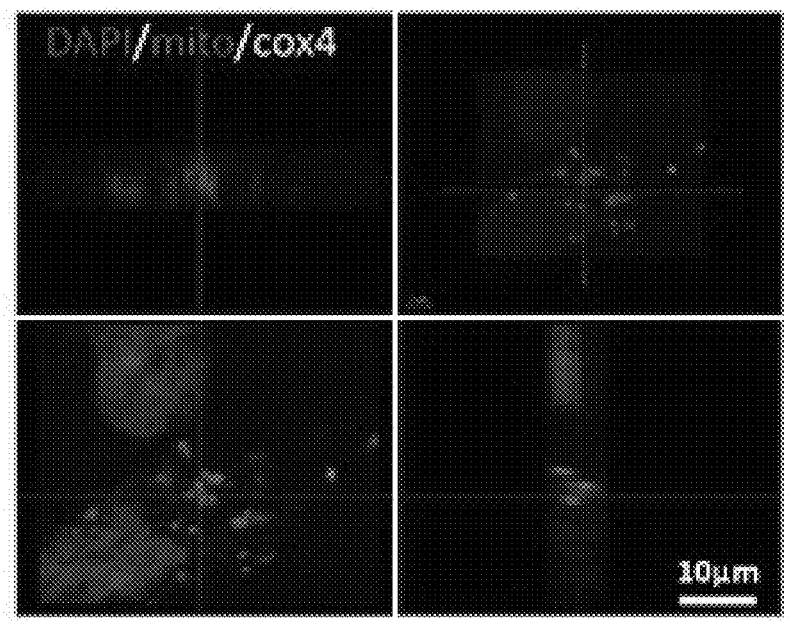
Figure 4D:
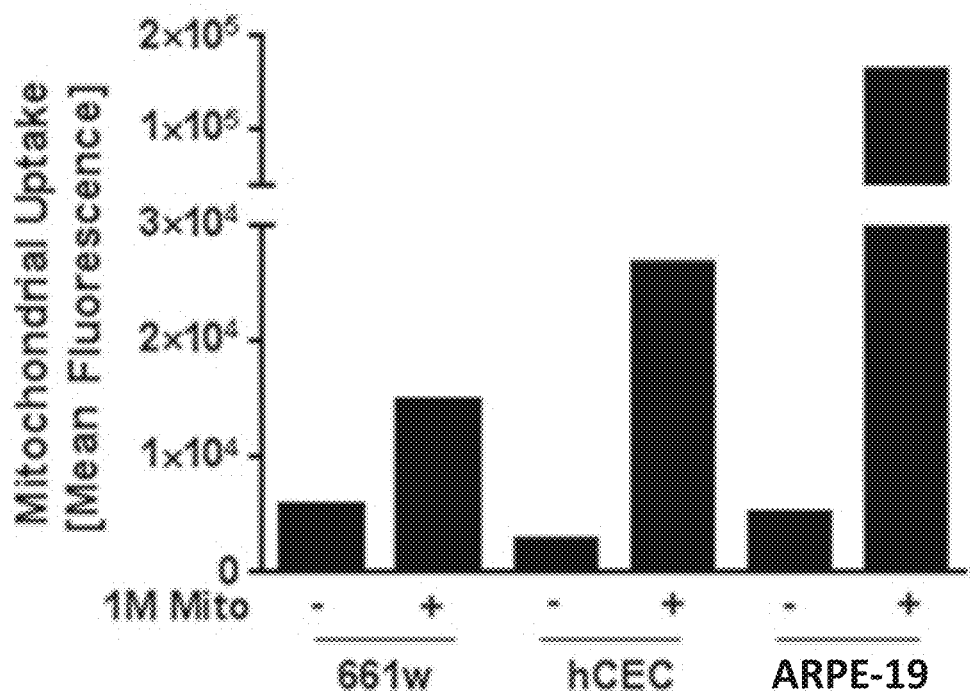
Figure 5A:
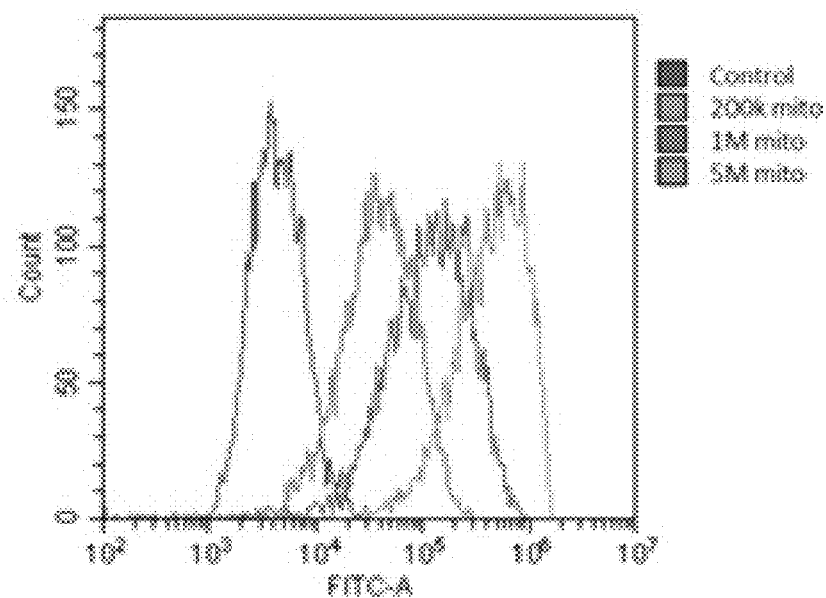
Figure 5B:
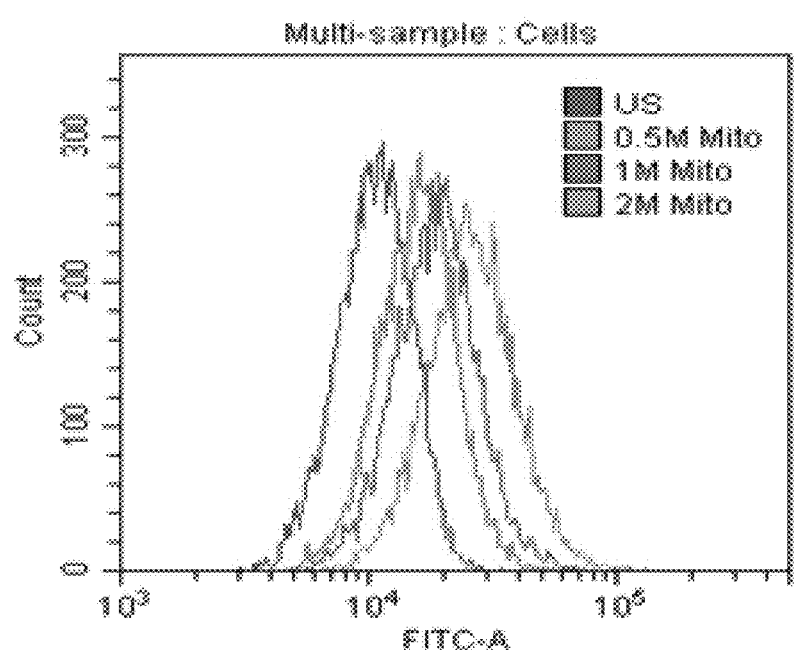
Figure 5C:
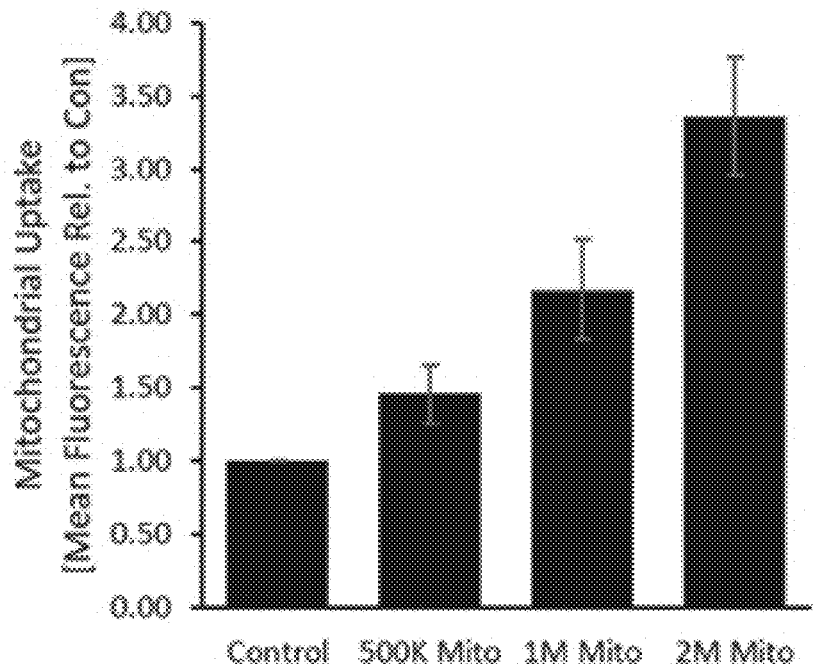
Figure 6:
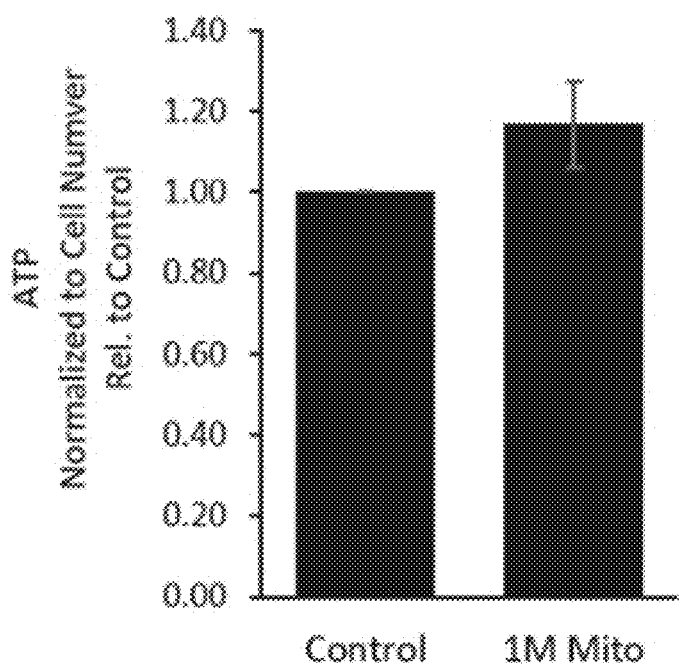
Figure 7:
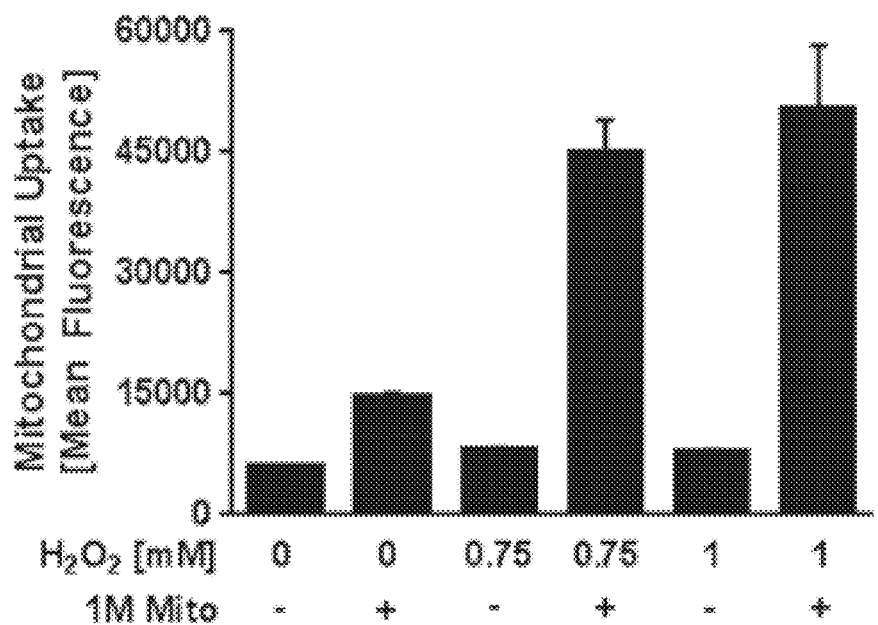
Figure 8A:
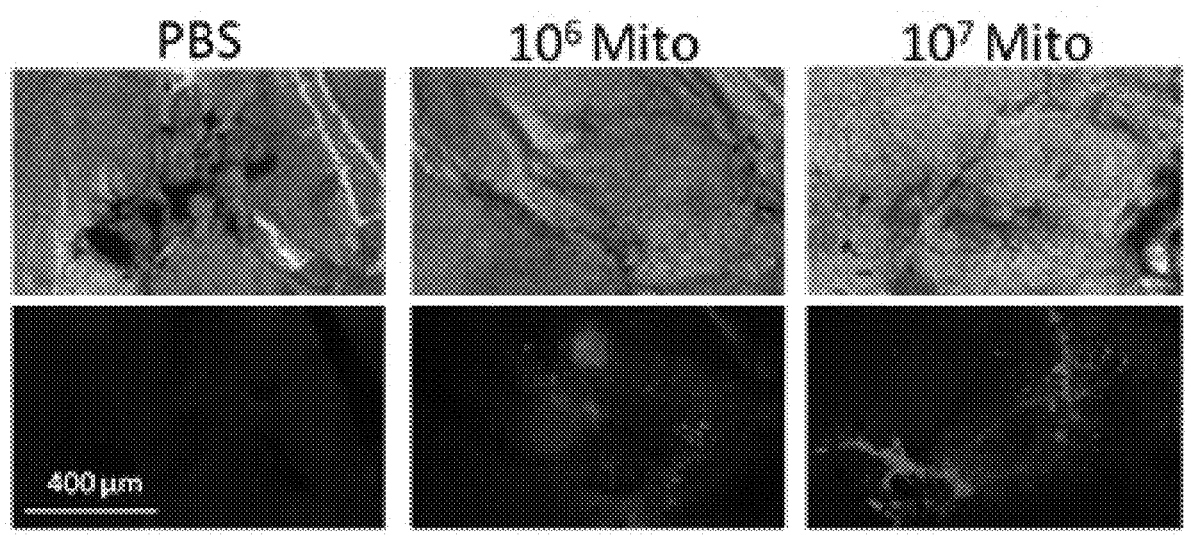
Figure 8B:
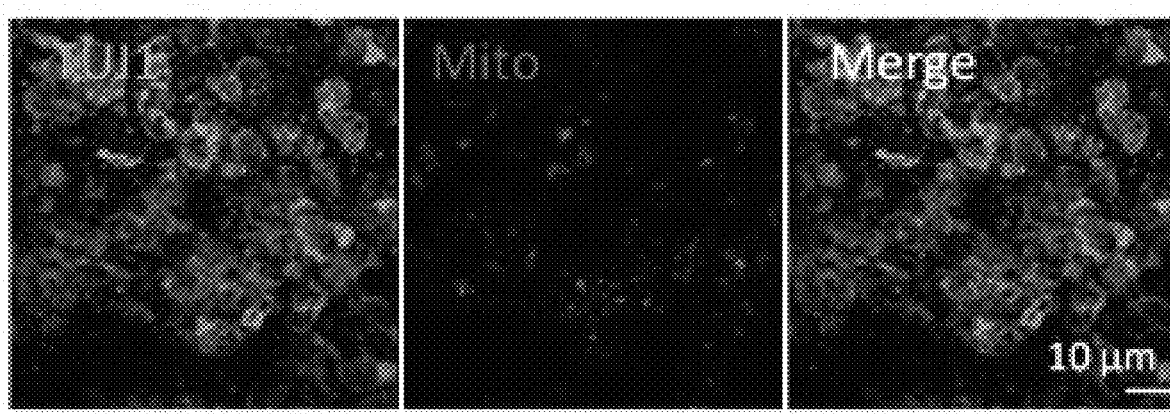
Figure 8C:
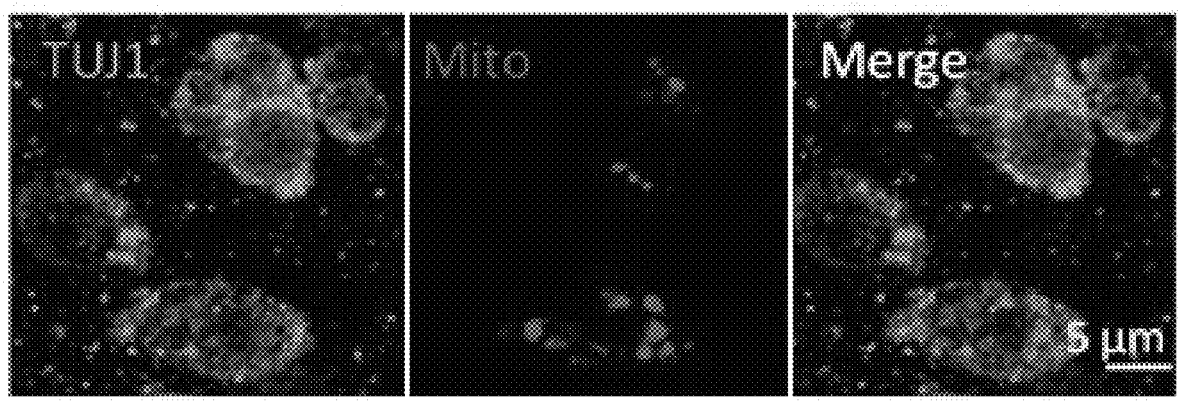
Figure 10:
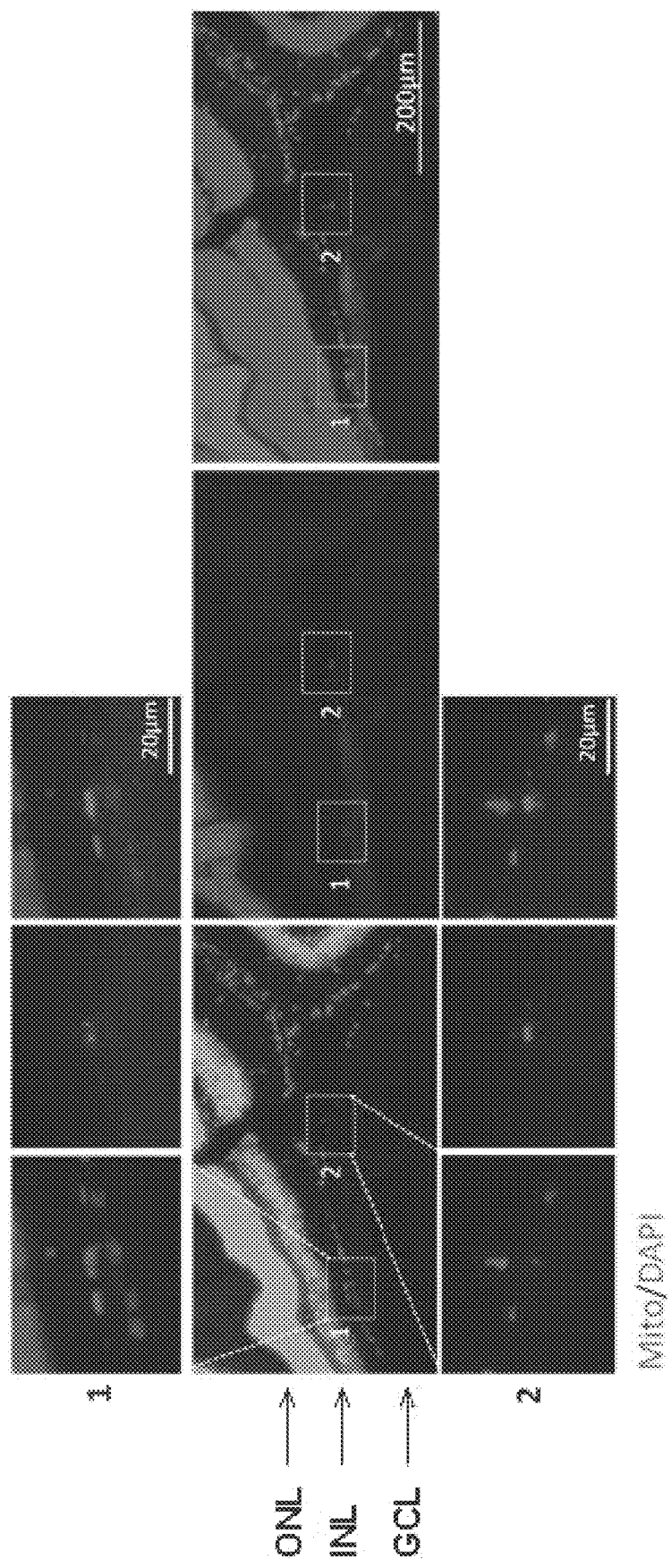
Figure 11A:
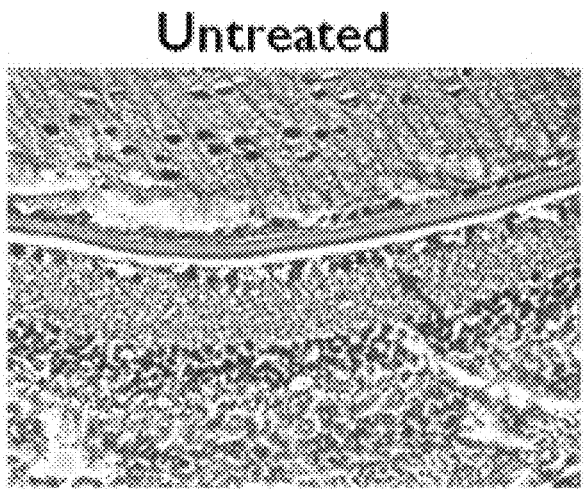
Figure 11B:
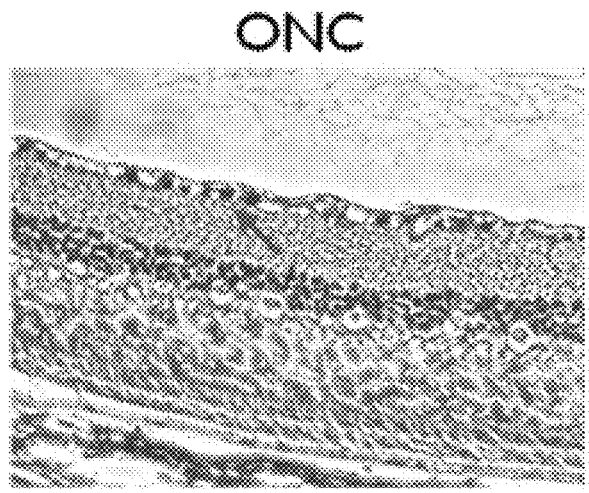
Figure 11C:
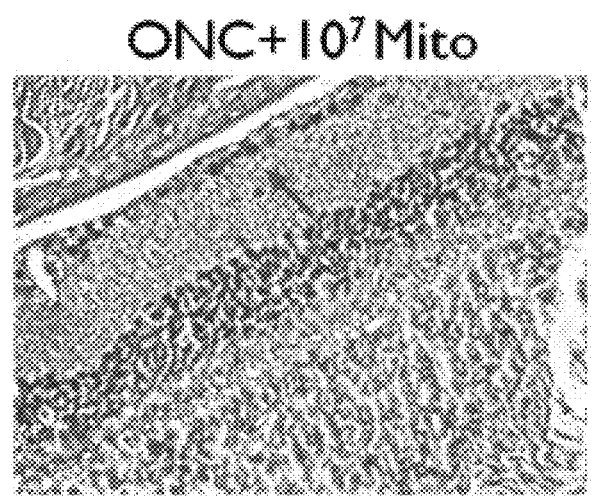
Figure 11D:
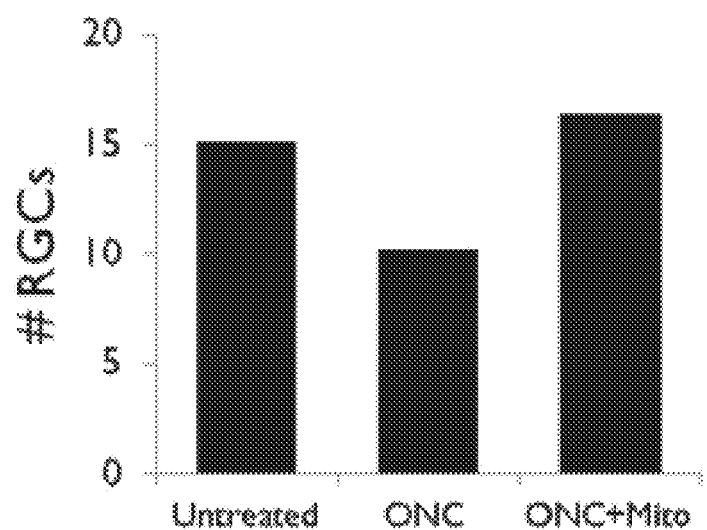
Figure 12A:
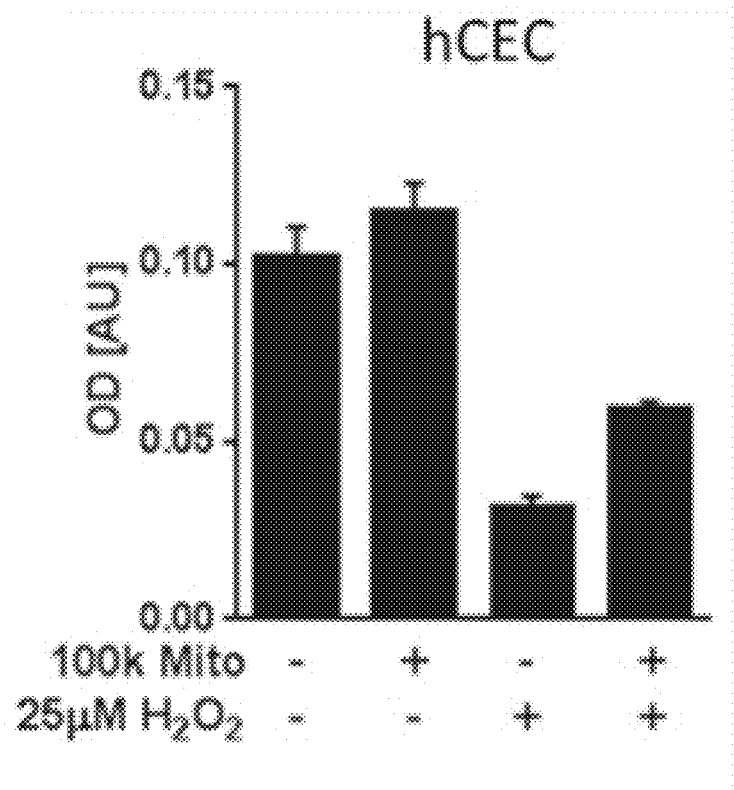
Figure 12B:
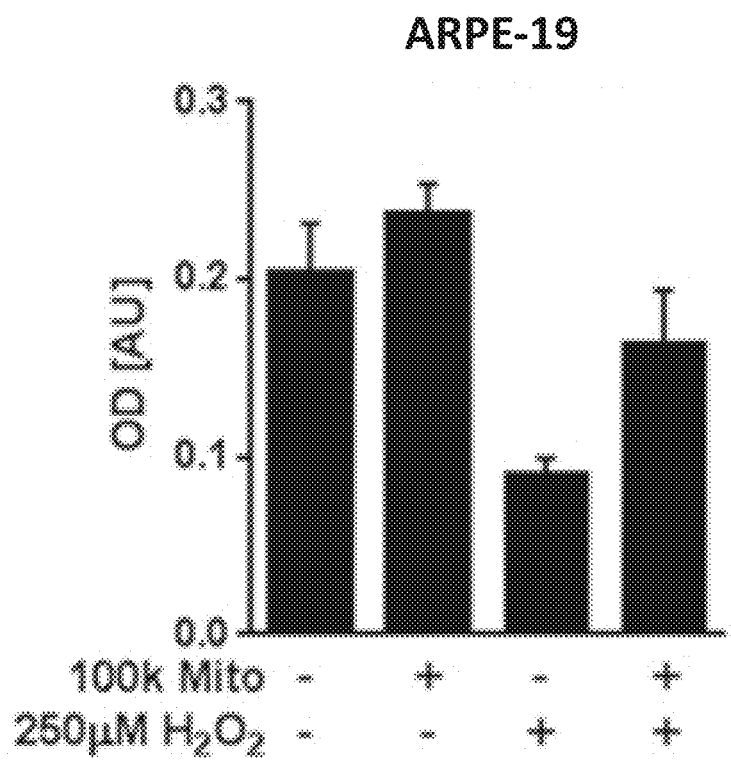
Figure 13A:
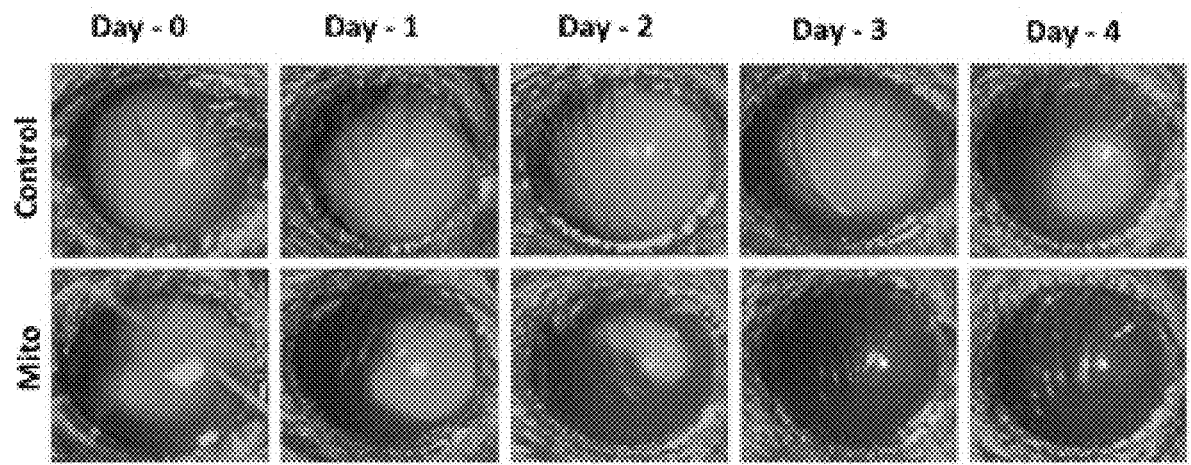
Figure 13B:
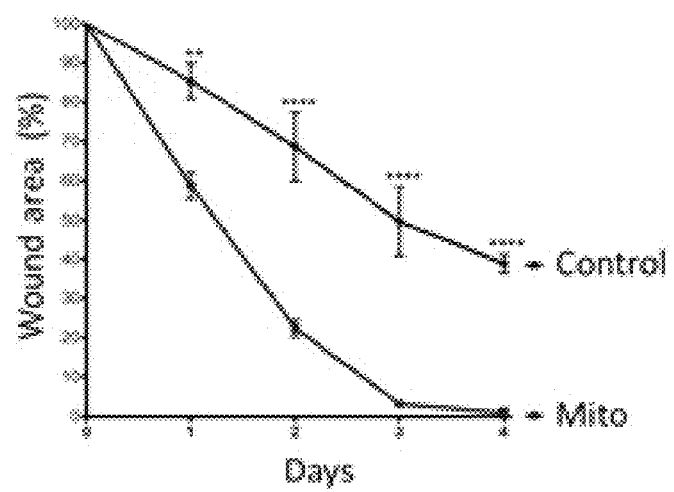
Figure 14A:
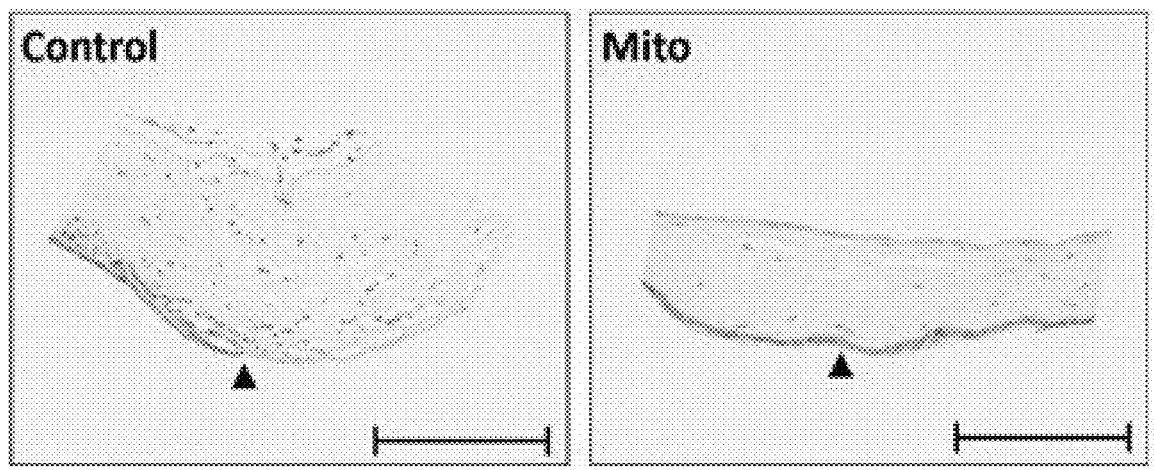
Figure 14B:
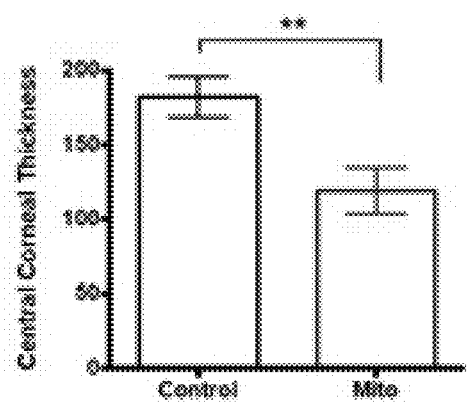
Figure 15A:
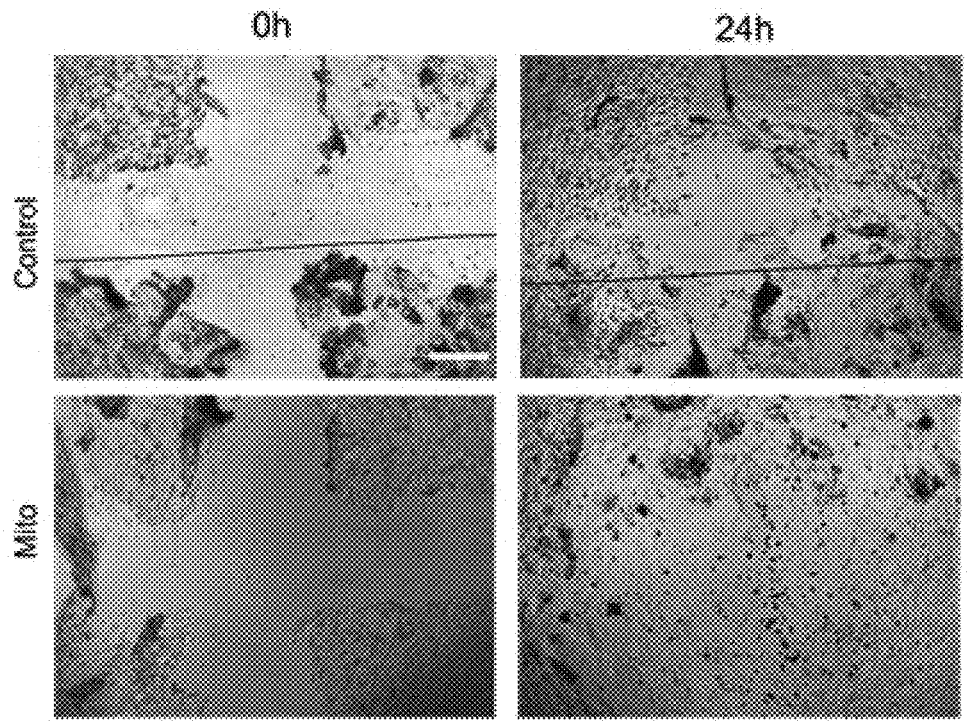
Figure 15B:
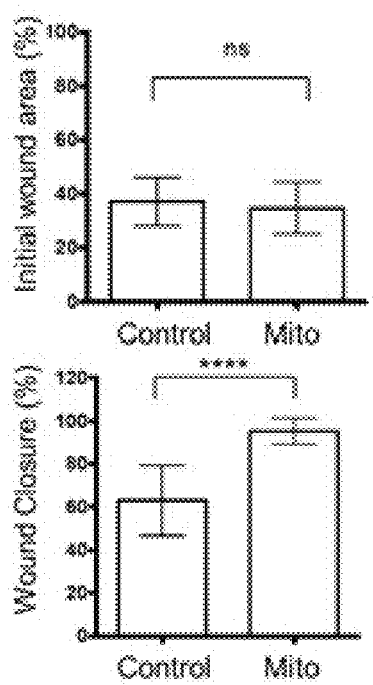
Figure 16A:
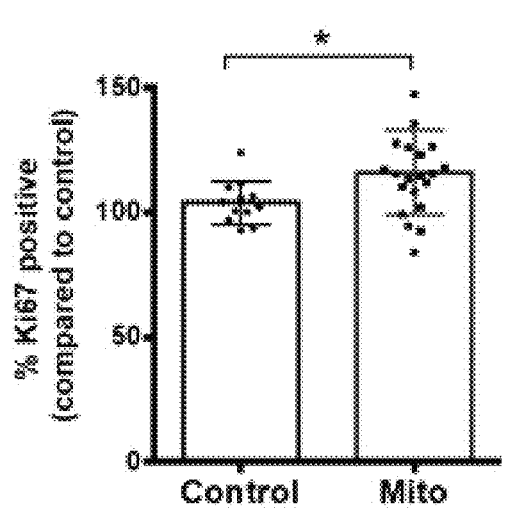
Figure 16B:
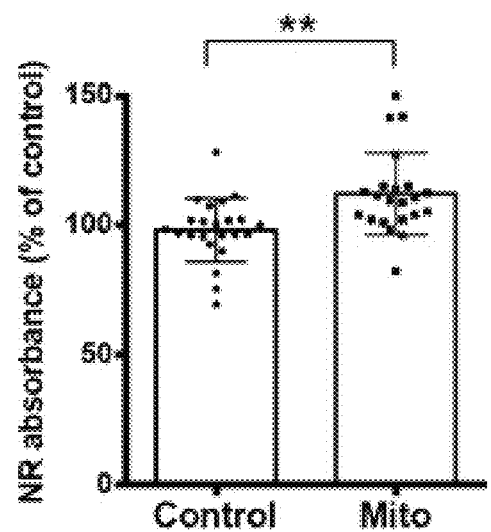

FIGS. 1A-1C are schemes illustrating various exogenous mitochondria delivery techniques and routes. FIG. 1A illustrates microinjection, nanotube cell-cell connection, vesicle-mediated delivery and systemic injection (Gollihue and Rabchevsky, 2017, *Mitochondrion;* 35:70-79). FIG. 1B is a schematic presentation of the eye and of intravitreal injection site (Asai et al., 2013, Intl. Nanomedicine, 8:495-503). FIG. 1C is a background art schematic presentation of further optional intraocular sites for mitochondrial injection (Dubald et al., 2018, Pharmaceutics, 13:10);

FIGS. 2A-2B show the various layers of the retina. FIG. 2A is an optical coherence tomography (OCT) image of retinal layers, showing the location of the retinal ganglion cells layers in contact with the vitreous. RNFL/GC: retinal nerve fiber layer/ganglion cells layer; INL: inner nuclear layer; ONL: outer nuclear layer; IS/OS: junction between photoreceptors inner/outer segments; RPE: retinal pigment epithelium. FIG. 2B is a background art scheme showing a section of the retina and the optic nerve (https://biology4isc.weebly.com/eye.html);

FIGS. 3A-3D show purification and quality of mitochondria isolated from mouse liver. FIG. 3A is a Western blot analysis showing the mitochondrial marker Cox4 and the cytosolic marker β-actin in a purified mitochondrial fraction (Mito), a cytosolic fraction (Cyto) and a control sample taken before fractionation (Input). FIG. 3B is a graph showing oxygen level changes following addition of mitochondrial substrates (succinate, ADP) to purified mitochondria. FIG. 3C is a bar graph showing base-line level of ATP production in purified mitochondria (Mito), and ATP levels following addition of ADP substrate (Mito-ADP) or the ATP-synthase inhibitor oligomycin (Mito-Olm). FIG. 3D is a collection of microscopic images of purified mitochondria stained with MitoTracker® Red CMXRos dye, a marker for active mitochondria with appropriate membrane potential (lower left image (red)), and with MitoTracker® Green FM dye, a marker for pan mitochondria (upper right image (green)). The lower right image is a superposition of the two former images, and the upper left image is a confocal image;

FIGS. 4A-4D show in vitro uptake by SH-SYSY cells, human ARPE-19 cells, human corneal endothelial cells (hCEC), and mouse RGC cells (661W) of mitochondria isolated from ARPE-19 cells or from mouse liver. FIG. 4A depicts flow cytometry histograms showing the counts of SH-SY5Y cells transplanted with exogenous mitochondria and pre-stained with MitoTracker® Green Fixable Mitochondrion dye (MTG FM) (middle histogram, Neurons+mito), unstained SH-SY5Y cells not transplanted with exogenous mitochondria (left histogram, Neurons; negative control), and SH-SY5Y cells non-transplanted with exogenous mitochondria and stained with MTG FM for endogenous mitochondria (right histogram, Stained neurons; positive control). FIG. 4B is a collection of immunofluorescence images showing uptake by SH-SY5Y cells of freshly isolated mitochondria stained with MitoTracker® Red CMXRos (MTR) (Mito; upper left image (red spots)). Neuronal cells were immunostained for cytosolic, non-mitochondrial protein β-actin (Actin; upper middle image (green)) and for Cox4 for marking endogenous mitochondria (Cox4; lower middle image (light blue)), and their nuclei were stained with the nuclear marker DAPI (DAPI; blue). The arrow in the merged image (lower right image) shows translocation of exogenous mitochondria into axons in a neuronal process. The lower left panel is a confocal image of stained neuronal cells. FIG. 4C is a collection of immunofluorescence images of SH-SY5Y cells transplanted with fresh exogenous mitochondria. The images depict exogenous mitochondria (red) and endogenous mitochondria (brighter spots (yellow). FIG. 4D is a bar graph showing mean green fluorescence intensity in flow cytometry analysis of 661W, hCEC and aRPE-19 cells transplanted with 1 million (1M) mitochondria stained with MTG;

FIGS. 5A-5C show dose dependency of exogenous mitochondrial uptake. FIGS. 5A and 5B are flow cytometry histograms of hCEC cells and 661W cells, respectively, incubated for 24 hours with increasing amounts of labeled mitochondria. FIG. 5A: left to right histograms: control (unstained, non-transplanted cells); 200,000 mitochondria; 1M mitochondria; and five million (5M) mitochondria. FIG. 5B: left to right histograms: control (unstained, non-transplanted cells); half a million (0.5M) mitochondria; 1M mitochondria; and two million (2M) mitochondria. FIG. 5C is a bar graph showing the mean green fluorescence intensity relative to control obtained from 3 independent experiments;

FIG. 6 is a bar graph showing ATP production in mouse RGC 661W cell line transplanted with fresh mitochondria isolated from C57BL/6 mice livers (n=5, i.e., 5 independent experiments);

FIG. 7 is a bar graph showing the effect of oxidative stress (application of $H_2O_2$ for 1 hour) on mitochondrial uptake by mouse retinal ganglion cells (661W);

FIGS. 8A-8C show in vivo retinal uptake of purified, fresh mitochondria (about $10^6$ or about $10^7$) isolated from mouse liver. The mitochondria, stained with MitoTracker® Red CMXRos (Mito; red), were injected into the mouse vitreous of one eye, and the control eye was injected with PBS. FIG. 8A is a collection of confocal images (upper images) and fluorescent microscope images (lower images) of wholemount retinae injected either with stained mitochondria or PBS. FIGS. 8B-8C are collections of fluorescence microscope images of wholemount retinae of two exemplary mice injected with stained mitochondria. Middle images depict fluorescent internalized mitochondria (Mito; red); left images depict fluorescent ganglion cells immunostained with Tuj1 (TUJ1; green); and right images are merges of the left and middle images;

FIGS. 9A-9B are images of wholemount retinae of mice intravitreally injected with isolated mitochondria stained with MitoTracker® Red CMXRos (Mito; lower images (red)). FIG. 9A are confocal image (upper) and fluorescence image (lower) of retina transplanted with stained mitochondria injected to the vitreous of the control eye of an exemplary mouse, and FIG. 9B are confocal image (upper) and fluorescence image (lower) of retina transplanted with stained mitochondria injected immediately after optic nerve crush (ONC);

FIG. 10 is a collection of fluorescent microscope images of paraffin-embedded sections of an exemplary mouse eye intravitreally injected with freshly isolated mitochondria stained with MitoTracker® Red CMXRos (MTR), immediately after ONC. In the middle panel, the left image is DAPI staining (blue) of retinal layers. Retinal layers are indicated (ONL—outer nuclear layer; INL—inner nuclear layer; GCL—ganglion cells layer); the middle image depicts stained mitochondria in the retinal layers (red); and the left image is a superposition (merge) of the left and middle images. The rectangular frames in the images of the middle panel are zoomed-in and depicted in the upper panel (frame 1) and lower panel (frame 2), correspondingly, namely, from left to right: DAPI staining, MTR staining and merged zoomed-in images;

FIGS. 11A-11D show RGCs counts in exemplary sections of mice retinae observed two weeks after the mice experienced ONC. FIGS. 11A-11C are images of representative sections of H&E stained retina either intact or non-injured, namely, without ONC (FIG. 11A; untreated), injured (FIG. 11B; ONC) or injured and immediately treated intravitreally with isolated mitochondria (FIG. 11C; ONC+$10^7$ Mito). The arrows point to the RGCs layer. FIG. 11D is a bar graph showing the number of intact RGCs in these sections;

FIGS. 12A-12B are bar graphs showing the viability (measured as optical density (OD)) of two human cell lines of ocular origin: hCEC (FIG. 12A) and ARPE-19 (FIG. 12B) subjected to oxidative stress, namely, treated with 2.5 µM $H_2O_2$ or 250 µM $H_2O_2$, respectively, followed by incubation with about 100,000 (100 K) fresh mitochondria (Mito) isolated from ARPE-19 cells. Cell viability was evaluated using neutral-red (for hCEC cells) or XTT (for ARPE-19 cells) assays;

FIG. 13A-13B show the effect of mitochondrial transplantation on corneal wound healing. FIG. 13A are slit-lamp images and fluorescein staining of mice eyes injured by exposure to NaOH. Upper row: alkali injured eye not treated with mitochondrial transplantation. Lower row: alkali injured eye treated with mitochondria transplantation for 4 days. FIG. 13B are graphs showing epithelium wound size closure as a function of time from day 1 to day 4 after injuring the eye, for control (untreated eyes; upper graph) and eyes treated with mitochondria transplantation (lower graph). N=8 in control and mitochondria treated groups. p<0.01; **p<0.0001, Student's t-test;

FIGS. 14A-14B show the effect of mitochondrial transplantation on corneal thickness. FIG. 14A are representative histology H&E-stained sections of corneas from alkali-injured eyes of mice either not treated with mitochondrial transplantation (control) or treated with mitochondria transplantation (Mito). Scale bar=200 µM. p<0.01, Student's t test. FIG. 14B are bar graphs showing the corneal thickness of mitochondria treated versus untreated eyes;

FIG. 15A-15B show the effect of mitochondrial transplantation on corneal wound healing in primary human corneal epithelial cells, isolated from human corneas. FIG. 15A are representative images of primary human corneal epithelial cell culture after a cross-shaped scratch was performed in the culture. Left: Time 0h—immediately after the scratch was performed. Right: Time 24h-24 hours after scratching. Upper panel: control—cells treated with mitochondria transplantation after culture scratching. FIG. 15B are bar graphs quantifying the initial wound area after the scratch (top) and the percentage of wound closure, as determined by calculating the wound area at time 24h relative to the wound area at time 0h (Bottom). n=12 (control); n=18 (mito), seeded from a mix of cells harvested from 6 human corneas in 2 individual experiments. Scale bar=200 µM.****p<0.0001, Student's t-test; and FIGS. 16A-16B are bar graphs showing the effect of mitochondria transplantation on proliferation of primary human epithelial cells as measured by counting ki67 positive cells (left) or Neutral Red uptake (right) in cells not treated with mitochondria (control) compared to cells treated with mitochondria transplantation (mito). *p<0.05, **p<0.01, Student's t-test.

DETAILED DESCRIPTION

The present disclosure relates, at least in part, to ocular mitochondrial transplantation as means to treat diseases, disorders and conditions associated with mitochondrial dysfunction in the eye.

The present disclosure is based on a discovery by the present inventors that fresh, isolated mitochondria injected to the vitreous cavity can be internalized by retinal ganglion cells (RGCs) and improve retinal function after ischemic insult in the retina. The present disclosure is based on a further discovery by the present inventors that damaged RGCs, e.g., following optic nerve crash, were significantly improved by transplanting freshly isolated mitochondria thereto. In yet a further discovery by the present investors, transplantation of mitochondria to the corneal epithelium layer significantly improved corneal healing after NaOH damage. Based on these discoveries, it has been envisaged by the present inventors that mitochondria transplantation may be an effective treatment for ocular diseases and conditions associated with impairment of mitochondrial function, wherein transplantation may be directed to various parts of the eye in need thereof, for example, vitreous cavity, cornea, the anterior chamber, the suprachoroidal space, or the surface of the eye, by local as well as by systemic (e.g., intravenous injection) ad ministration.

The mitochondrial respiratory chain is the essential final common pathway for aerobic metabolism. Defects in any of the numerous mitochondrial pathways can cause diseases or disorders. Tissues and organs that are highly dependent upon aerobic metabolism are prone to be affected by mitochondrial dysfunction, for example, peripheral nervous system, central nervous system, endocrine glands, heart, ears, eyes, gastrointestinal tract, kidneys, bone marrow and dermis.

Already in 1982, successful mitochondrial transplantation was demonstrated in vitro when Clark and Shay found that simple co-incubation of isolated mitochondria with mammalian cells resulted in spontaneous internalization of the mitochondria by the cells (Clark and Shay, 1982, Somatic cell genetics, 8:15-21). Transplanted mitochondria were functional inside the recipient cells; they could increase oxygen consumption, ATP production and cell proliferation, and were able to replace dysfunctional mitochondria. In vivo mitochondrial transplantation is also known in the art. For example, injection of autologous mitochondria directly into ischemic rabbit hearts, immediately before reperfusion, resulted in increased mechanical heart function, smaller infarct size, higher ATP content and a significant reduction in troponin blood levels. Exogenous mitochondria have been taken-up by cardiomyocytes as early as 2 h after transplantation (McCully et al., 009, *American journal of physiology Heart and circulatory physiology*, 296:H94-H105). Further in vivo studies are disclosed, for example, in Gollihue et al., 2018, *Neural Regeneration Research* 13:194-197; Chen et al., 2016, *J. Pineal Research* 61:52-68; Kuo et al., 2017, *Neurosurgery* 80:475-488; Robicsek et al., 2018, *Schizophrenia Bulletin* 44:432-442; Shi et al., 2017, *Mitochondrion* 34:91-100; and Emani and McCully, 2018, *Translational Pediatrics* 7:169-175.

Strategies of mitochondrial transplantation are known treatment paradigms attempted in treating mitochondrial dysfunction related, e.g., to injury and disease states such as central nervous system (CNS) diseases (e.g., Alzheimer's disease, Parkinson's disease), stroke, traumatic brain or spinal cord injury, acute lung injury, or cardiac ischemia.

There are many benefits to replacing mitochondria in injury or disease states, including increasing energy production, increasing calcium buffering capacity, and replacing mitochondrial DNA.

"Mitochondrial transplantation", herein also interchangeably used with terms such as "mitochondrial transfer", "mitochondrial internalization" and "mitochondrial replacement", refers to transplantation of mitochondria isolated from a healthy tissue into diseased and/or injured tissues. There are various techniques for transplanting exogenous mitochondria, and any scaffold that contains mitochondria, either synthetic or biological, may by employed in accordance with embodiments described herein.

Isolated mitochondria may be delivered to the eye via local and/or systemic delivery routes. For example, mitochondria may be directly injected or microinjected to the eye; topically applied; delivered via cell-mediated transfer, e.g., utilizing tunneling nanotubes; delivered via vesicle-mediated delivery, nanoparticle/polymer mediated delivery, and/or peptide-mediated delivery; and/or delivered within an amniotic membrane. Each of these results in mitochondria incorporation into host cells. Some of the various delivery techniques are schematically shown in FIG. 1A.

In cell-mediated transfer of mitochondria, a donor cell, whether implanted or endogenous such as a bone marrow derived stromal cell (mBMSC), astrocyte or mesenchymal stem cell (MSC), secretes vesicles containing mitochondria, which are subsequently taken into recipient cells and tissues (e.g., brain neurons, lung tissue).

Attachment of the mitochondria-donating cells (e.g., mBMSCs) via connexin pore gap junction formation appears necessary for this donation, with nanotubes formed between the host cells and mitochondria-containing vesicles (FIG. 1A, nanotube).

Microinjection is the use of a micropipette to inject a substance, e.g., mitochondria, at a microscopic or borderline macroscopic level, wherein the target is often a living cell but may also include intercellular space. Microinjection is usually conducted under a microscope (FIG. 1A, microinjection).

Mitochondria may also be transplanted using systemic delivery approaches (FIG. 1A, systemic) such as vascular perfusion of mitochondria, for example, through the coronary artery, or via vein injections. Like direct injection, systemic delivery techniques result in functional protection of injured tissues. Exogenous mitochondria systemically delivered may reach both targeted as well as untargeted tissues, wherein the uptake mechanism is most probably endocytosis. In liquefactive necrosis or diseases in which mitochondria dysfunction is more focal, direct transplantation of concentrated healthy mitochondria within that injured tissue is more applicable than systemic delivery.

Uptake of mitochondria-containing vesicles (FIG. 1A, vesicle-mediated) is probably via endocytosis, a phenomenon known as massive endocytosis. Once internalized, the mitochondria are released into the cytosol. The use of vesicles or liposomes reduces exposure of the mitochondria to possible adverse effectors in the extracellular environment such as reactive oxygen and nitrogen species. A caveat to this technique is the difficulty in packaging high numbers of mitochondria within liposomes.

Amniotic membrane, or amnion, is the innermost layer of the placenta and consists of a thick basement membrane and an avascular stromal matrix. Amniotic membrane transplantation has been used as a graft or as a dressing in different surgical subspecialties. In the field of ophthalmology, it is used broadly to reconstruct the ocular surface after various procedures; as a graft for ocular surface melts; and as a bandage to promote healing in cases of persistent epithelial defects or ocular surface inflammation. Amniotic membrane loaded with mitochondria promotes the membrane's ability to confer healing, e.g., of corneal epithelium.

Transplanted mitochondria may be non-autologous, e.g., mitochondria isolated from cell culture. Alternatively, or additionally, transplanted mitochondria may be autologous.

Embodiments described herein pertain to transplantation, by either route, of freshly isolated mitochondria which may be non-autologous or autologous.

In accordance with embodiments described herein, before transplantation, the functionality and integrity of transplanted mitochondria is monitored, for example, by electron microscopy for assessing morphology and purity, by measuring mitochondrial respiration and energy production, by assessing membrane potential, for example, by the use of fluorescence membrane potential dyes, and/or by measuring calcium buffering.

Methods of Treatment

Mitochondrial dysfunction has a critical role in many ocular diseases. In addition, the eye is highly susceptible to ischemia. Yet, mitochondrial transplantation in the eye has not been attempted. The RGC layer is the first cell layer of the retina having direct contact with the vitreous. The present inventors envisaged that mitochondria injected to the vitreous cavity may be internalized by the RGCs. Indeed, the present inventors have successively demonstrated, for the first time, mitochondria internalization into the retina, and more specifically into RGCs, as described in Example 5 herein. Moreover, as described in Examples 6 and 7 herein, damaged retinal function after ischemic insult has been improved by transfer of mitochondria into RGCs. Furthermore, Examples 9 and 10 herein demonstrate that mitochondria transplantation to injured corneal epithelium layer significantly improved the rate and completeness of corneal wound healing.

In one aspect, the present disclosure relates to a method for treatment of mitochondrial dysfunction, mitochondrial destruction or depletion in the eye of a subject, the method comprising administering to the eye of the subject a therapeutically effective amount of isolated mitochondria, thereby treating mitochondrial dysfunction, mitochondrial destruction or depletion.

Embodiments of the present disclosure utilize the disclosed method for treatment of various pathologies of the eye related to, or associated with, mitochondrial dysfunction or impairment, whereby, according to at least some of these embodiments, a therapeutically effective amount of allogeneic, syngenic, xenogeneic and/or autologous exogenous mitochondria is being transferred to the eye by any of the means and routes described herein.

The terms "allogeneic mitochondria transfer" and "allogeneic mitochondria transplant", as use herein, are interchangeable and refer to mitochondria taken from one individual and transplanted into another individual of the same species but with a different genotype. For example, an allogeneic mitochondria transplant is mitochondria transplant donated from one person to another person who is not an identical twin, but may be, for example, a living related, or living unrelated acceptor. For example, allogeneic mitochondria may be extracted from a tissue (e.g., placenta) of one person, and transferred to tissues of another person of a different genotype. Allogeneic mitochondria transplant also includes transplanted mitochondria extracted from a cell culture. "Allogenic", as defined herein, means involving, derived from, or being individuals of, the same species that are sufficiently unlike genetically to interact antigenically.

The terms "syngenic" or "syngeneic", as used herein, are interchangeable and mean genetically identical, or sufficiently identical and immunologically compatible as to allow for transplantation. For example, syngenic mitochondria or syngenic mitochondria transplant may be obtained from an identical twin.

The terms "autologous mitochondria transfer" and "autologous mitochondria transplant", as used herein, are interchangeable and refer to mitochondria taken from the same person, for example from a healthy tissue or organ of the a person, and transferred to/transplanted in a diseased or injured tissue or organ of that same person.

The terms "xenogeneic mitochondria transfer" and "xenogeneic mitochondria transplant", as used herein, are interchangeable and refer to mitochondria derived from, or originating in, another species. For example, a xenogeneic mitochondria transplant is mitochondria transplant donated from mouse or rabbit to a human subject.

The term "exogenous mitochondria", as used herein, refers to allogeneic, autologous, xenogeneic or syngenic mitochondria that have been made to enter into, or have been transferred to, a cell or tissue by any of the natural or artificial known means for internalization. Exogenous mitochondria are to be distinguished from endogenous mitochondria, which are the naturally occurring mitochondria in the cells. Exogenous mitochondria may be isolated from their natural cellular environment/components and be purified or at least partly purified.

Mitochondrial dysfunction arises, for example, from an inadequate number of mitochondria, or a dysfunction in their electron transport and ATP-synthesis machinery. It is a characteristic of aging, certain injuries such as injury to the eye and of some chronic diseases. Mitochondrial dysfunction may be congenital and associated with modifications, e.g., mutations, in nuclear DNA and/or mtDNA.

Structurally, mitochondria have four components. The outer membrane, the inner membrane, the intermembrane space and the matrix. They perform numerous tasks, such as pyruvate oxidation, the Krebs cycle, and metabolism of amino acids, fatty acids and steroids, but the most crucial is probably the generation of energy as adenosine triphosphate (ATP) by means of the electron transport chain (also termed the "respiration chain" or "respiration process"), and the oxidative phosphorylation system. The ability of cells to produce almost all high-energy molecules such as ATP is directly related to the ability of mitochondria to: (1) convert the energy of metabolites to reduced nicotinamide adenine dinucleotide (NADH); and (2) transfer electrons from NADH to the respiration chain and eventually to molecular oxygen, while pumping protons from the mitochondrial matrix across the inner mitochondrial membrane to the intermembrane space. This process creates a transmembrane proton gradient ($\Delta p$) and an electrochemical gradient ($\Delta \psi_m$) across the mitochondrial inner membrane. The transmembrane potential created by the proton gradient uses ATP synthase to flow protons back across the inner mitochondrial membrane and employs the energy produced by this process to drive adenosine diphosphate (ADP) phosphorylation to ATP.

Mitochondrial dysfunction is characterized by a loss of efficiency in the electron transport chain and reductions in the efficiency of synthesis of high-energy molecules, such as ATP. At the molecular level, a reduction in mitochondrial function occurs due to at least the following changes: (1) a loss of maintenance of the electrical and chemical transmembrane potential of the inner mitochondrial membrane; (2) alterations in the function of the electron transport chain; or (3) a reduction in the transport of critical metabolites into mitochondria.

One consequence of the electron transport process is the production of reactive oxygen species (ROS), highly reactive free radicals that are produced as a by-product of oxidative phosphorylation. The main sources of ROS and the related reactive nitrogen species (RNS), are mitochondria, and mitochondrial dysfunction may result in elevated levels of free radicals that can damage cellular lipids, proteins, and DNA. In addition to creation of ROS/RNS, an impaired electron transport process can induce protein uncoupling, resulting in uncontrolled leak of protons back across the proton gradient of the inner mitochondrial membrane into the mitochondrial matrix and partial loss of the electrochemical gradient. This leak results in reduced ATP production, and inappropriate damage to mitochondrial membrane lipids such as the inner mitochondrial membrane phospholipid cardiolipin which is highly ROS/RNS-sensitive. Cardiolipin is an important component of the electron transport chain, providing stability for the cytochrome/enzyme complexes in the inner mitochondrial membrane. Once adversely damaged by ROS/RNS, oxidized cardiolipin instigates loss of electron-transport function.

The number and functional status of mitochondria in a cell can be changed, e.g., improved by naturally or artificially induced intracellular processes, for example: (1) fusion of partially dysfunctional mitochondria and mixing of their undamaged components to improve overall function; (2) generation of entirely new mitochondria (fission); and/or (3) removal and complete degradation of dysfunctional mitochondria (mitophagy). These events are controlled by complex cellular processes that sense the deterioration of mitochondria, such as the depolarization of mitochondrial membranes or the activation of certain transcription pathways.

Alternatively, or additionally, the number and functional status of mitochondria in a cell can be manipulated by application of extracellular approaches such as mitochondrial transplantation as disclosed herein.

The terms "mitochondrial disease", "mitochondrial disorder" and "mitochondrial condition", as used herein, are interchangeable and in the context of some embodiments described herein, refer to a disease, disorder or condition directly or indirectly caused by, exacerbate by, worsen by, a sequelae of, or deteriorated due to, mitochondrial dysfunction as defined herein.

Mitochondrial diseases are categorized as either primary or secondary to indicate their underlying etiology. Primary mitochondrial diseases result from direct impairment of mitochondrial functions due to modifications (e.g., mutations) of genes located in either mitochondrial DNA or nuclear DNA (nDNA). In contrast to the nDNA, mtDNA lacks histones, making it more prone to mutagenesis (~10-fold greater than in nDNA). All but 13 of the more than 1,000 proteins necessary to mitochondrial constitution and function are encoded by nuclear genes. Secondary mitochondrial dysfunction results either from environmental factors and/or other genetic disorders which affect mitochondrial function.

Nuclear gene defects which account for primary mitochondrial diseases and disorders may be inherited in an autosomal recessive manner, or an autosomal dominant manner. Mitochondrial DNA is transmitted by maternal inheritance. All mitochondria (and all mtDNAs) in the zygote are derived from the ovum. Therefore, a mother carrying a mtDNA mutation passes it to all her children, but only her daughters will transmit it to their progeny. A female harboring a mtDNA point mutation may transmit variable amounts of mutant mtDNA to her offsprings, resulting in considerable clinical variability among siblings within the same family.

There are thousands of mtDNA molecules in each cell and, in general, pathogenic mutations of mtDNA are present in some but not all of these genomes. As a result, cells and tissues harbor both normal (wild type) and mutant mtDNA, a situation known as heteroplasmy. Heteroplasmy can also exist at the organelle level: a single *mitochondrion* can harbor both normal and mutant mtDNA. Most mutations in mtDNA are certain point mutations. A minimal number of mutated mtDNAs must be present before oxidative dysfunction occurs and clinical signs become apparent, this is the threshold effect. The threshold for disease is lower in tissues that are highly dependent on oxidative metabolism, such as brain, heart, skeletal muscles, retina, renal tubules and endocrine glands. These tissues will therefore be especially vulnerable to the effects of pathogenic mutations in mtDNA.

Clinical syndromes may be caused by several different mtDNA mutations and, conversely, the same mutation can be presented in different ways depending on the level of heteroplasmy. There is no straight forward relation between the site of mutation and the clinical phenotype, even with a mutation in a single gene. For example, mutations in a mtDNA gene that are usually associated with mitochondrial encephalomyopathy, lactic acidosis and stroke like episodes (MELAS) syndrome may cause other syndromes as well. Conversely, mutations in different genes can cause the same syndrome, for example, MELAS.

In some embodiments, the eye pathology associated with mitochondrial dysfunction or impairment, which may be treatable by a disclosed method is an ocular manifestation of a systemic disease or condition in a subject. In accordance with these embodiments, a therapeutically effective amount of exogenous, isolated mitochondria is administered to the subject to thereby treat the ocular manifestation of a systemic disease or condition.

The term "ocular manifestation of a systemic disease", as referred to herein, is an eye condition that directly or indirectly results from a primary non-ocular disease process or injury in another part of the body. There are many diseases and conditions known to cause ocular or visual changes, such as, but not limited to, congenital, vascular, neoplastic, autoimmune, idiopathic, infectious, metabolic/endocrine, and/or hypertension diseases. Non-limiting examples of conditions which may have ocular manifestation include drugs usage, trauma and/or exposure to toxins.

Any systemic disease or injury manifested in the eye as impaired oxygen supply, ischemia (e.g., ischemic infarction of the inner retina), hemorrhages, occlusion of, or changes in, blood vessels (e.g., retinal embolization, central retinal vein occlusion (CRVO)), that is associated with mitochondrial dysfunction, mitochondrial destruction and/or mitochondrial depletion in the eye, for example, in the retina, may be treated by a disclosed method.

Diabetes, for example, has ocular manifestations such as diabetic retinopathy and macular edema, affecting up to 80% of those who have had the disease for 15 years or more, and is the leading cause of blindness in diabetic patients. Other diseases such as acquired immunodeficiency syndrome (AIDS), and hypertension are commonly found to have associated ocular symptoms. Systemic infection may also be manifested by ocular signs and symptoms. Ocular manifestations often prevail in numerous congenital syndromes, including Down syndrome, Marfan syndrome, myotonic dystrophy, tuberous sclerosis, metabolic disorders involving lysosomal storage and carbohydrate metabolism, and neurofibromatosis.

In some embodiment, the eye pathology associated with mitochondrial dysfunction or impairment which may be treated by a disclosed method is an ophthalmic disease, disorder or condition. In accordance with these embodiments, a therapeutically effective amount of exogenous, isolated mitochondria is administered to the subject to thereby treat the ophthalmic disease, disorder or condition.

As used herein, the phrases "ophthalmic disease, disorder or condition associated with mitochondrial dysfunction" and "ophthalmic disease, disorder or condition associated with a mitochondrial disease or disorder" are interchangeable and refer to an ophthalmic pathology affecting the normal state and function of the eye, which is directly or indirectly caused by, or exacerbate by, or sequelae of, a mitochondrial disease as defined herein. The eye is one of the most commonly affected organs in mitochondrial diseases, with devastating effects that may variably involve the extraocular eye muscles, levator palpebrae superioris muscle, lens, retina, and/or optic nerve. The etiology of many common ocular disorders is increasingly recognized to involve either an accumulation of mitochondrial DNA mutations and/or secondary mitochondrial damage.

Many primary mitochondrial diseases have ophthalmologic involvement, commonly with significant phenotypic overlap that may prohibit ready distinction of a specific genetic etiology based on clinical parameters alone. To further complicate matters, mutations in a given mitochondrial gene may be associated with a spectrum of different clinical phenotypes. The four most common norophthalmic abnormalities seen in mitochondrial disorders are bilateral optic neuropathy, ophthalmoplegia and ptosis, pigmentary retinopathy and retro chiasmal visual loss. Non-limiting examples of utilizing a contemplated method for the treatment of ophthalmic diseases, disorders or conditions associated with a primary mitochondrial disease or disorder are described herein below. Treatment, in accordance with these embodiments, comprises transplantation of exogenous isolated mitochondria directly to the eye by any of the routes described herein, and/or by any applicable systemic administration route.

In some embodiments, the ophthalmic disease is dominant optic atrophy (DOA), a genetic disease that primarily affects the retinal ganglion cells (RGC) and nerve fiber layer of the retina. Visual acuity typically decreases over the first two decades of life to a mean of from 20/80 to 20/120. Thinning of the neuroretinal rim appears to be a universal finding in DOA. Mutations in the nuclear-encoded dynamin-like GTPase nuclear gene OPA1, which is involved in mitochondrial fusion, are responsible for the majority of DOA cases. OPA1 mutations can cause mitochondrial disease even in the absence of optic atrophy (i.e., partial or complete wasting away of parts of the eye such as the optic nerve). In acute states, in accordance with a contemplated method, DOA may be treated, for example, by one or more injections of isolated mitochondria. Repeated injections of isolated mitochondria may be the treatment modality of choice for chronic states.

In some embodiments, the ophthalmic disease is Leber hereditary optic neuropathy (LHON), a bilateral optic neuropathy characterized by acute and painless central vision loss of both eyes in a sequential fashion over a period of days to months. The onset of visual loss typically occurs between the ages of 15 and 35 years. Visual acuities in LHON patients at the point of maximum visual loss range from no light perception to 20/20 with most patients deteriorating to acuities worse than 20/200. Color vision is severely affected, often early in the course, but rarely before, considerable acuity loss. The pathogenesis of LHON involves initial thickening of the retinal nerve fiber layers with disc pseudoedema and RGC loss within the optic nerve. LHON is a maternally inherited ophthalmologic disorder linked to at least three point-mutations in mitochondrial DNA, mainly in genes coding for proteins involved in respiratory chain complex I activity. Currently, no cure for LHON exists, although various approaches are attempted in improving visual outcome, including gene therapy approaches.

In some embodiments, the ophthalmic disease or disorder is chronic progressive external ophthalmoplegia (CPEO). "Ophthalmoplegia", as used herein, refers to the paralysis or weakness of the eye muscles. It is a complex disorder that impairs bilateral extraocular muscle mobility and can affect one or more of the six muscles that hold the eye in place and control its movement. CPEO is associated with ptosis but rarely with diplopia (double vision). Visual acuity is typically spared, although some patients may develop optic atrophy or retinal involvement. The disease is most commonly caused by a single mtDNA deletion mutation. The disease may be "sporadic" in that the mtDNA deletion occurs de novo in the affected individual and is unlikely to be transmitted to an affected individual's progeny. Other structural rearrangements or point mutations in mtDNA may also result in CPEO that can be transmitted in a maternal fashion. In addition, multiple mtDNA deletions or duplications can be the cause of the disease and result from mutations in any of a number of nuclear genes that are involved in mitochondrial DNA maintenance.

Chronic progressive external ophthalmoplegia is also a very common ocular manifestation of mitochondrial myopathies associated with other neurological or systemic abnormalities, such as bulbar and limb myopathies, deafness, ataxia, spasticity, peripheral neuropathy, gastrointestinal myopathy and the like. Associated ocular features include optic atrophy, pigmentary retinopathy, corneal changes, cataracts and Kearns-Sayre syndrome (KSS). The term "myopathy" means a muscle disease, in which the muscle fibers do not function properly. This results in muscular weakness and sometimes also in muscle stiffness and spasm. The term "mitochondrial myopathy", as used herein, refers to forms of mitochondrial disease that cause prominent muscle problems. Three types of muscles can be affected by myopathy: skeletal—the muscles around the bones and eyes; cardiac—the heart muscles; and smooth—the muscles lining the intestines, gastrointestinal tract, bladder and blood vessels.

In accordance with a contemplated method, treatment of CPEO may comprise transplantation of isolated mitochondria directly to the eye, e.g., to an extraocular muscle, and/or by systemic administration of isolated mitochondria.

In some embodiments, the ophthalmic disease or disorder treatable by a contemplated method is pigmentary retinopathy. Retinopathy is any damage (e.g., persistent or acute) to the retina, which may cause vision impairment. Retinopathy often refers to retinal vascular disease or damage to the retina caused by abnormal blood flow. Frequently, retinopathy is an ocular manifestation of a systemic disease such as diabetes or hypertension.

Pigmentary retinopathy (PR) refers to a group of inherited, degenerative disorders of the retina, characterized by progressive photoreceptor damage, leading to atrophy and cell death of the photoreceptors and adjacent layers of the retina. Pigmentary retinopathy primarily affects the rods and consequently the cones, causing blindness in advanced cases when central retina is involved. The initial symptoms of the disease include nyctalopia (night blindness), peripheral visual field constriction, and sometimes loss of the central visual acuity or visual field. Pigmentary retinopathy may be seen in the primary mtDNA disease neurogenic weakness, ataxia, and retinitis pigmentosa (NARP), which results from a point mutation in mitochondrial DNA.

Pigmentary retinopathy is the final common outcome of many retinal and chorioretinal disorders and often a common manifestation of numerous metabolic and neurodegenerative diseases. Pigmentary retinopathy can also occur in a range of other mtDNA cytopathies including Leigh syndrome (degenerative disorder involving the basal ganglia and brainstem), mitochondrial encephalomyopathy lactic acidosis and stroke (MELAS), myoclonic epilepsy and ragged red fibers (MERRF), LHON, Kearns-Sayre syndrome (KSS), and mitochondrial myopathy.

In accordance with a contemplated method, treatment of pigmentary retinopathy may comprise transplantation of exogenous isolated mitochondria directly to the eye, e.g., to the vitreous and/or by systemic administration of isolated mitochondria.

In some embodiments, the ophthalmic disease or disorder treatable by a contemplated method is Kearns-Sayre syndrome (KSS). Kearns-Sayre syndrome is a progressive external ophthalmoplegia (PEO) and pigmentary retinopathy with onset before 20 years of age. This syndrome is associated with mtDNA rearrangements (large deletions or duplications). It is always heterogenous and the concentration of the rearranged mtDNA in different tissues determines the age and manner of presentation, not all conform to the syndromes. Most patients with Kearns-Sayre syndrome develop a "salt and pepper" fundus. Visual acuity (acuteness) tends not to be severely impaired unless there is optic atrophy (degeneration). Other patients have generalized loss of the retinal pigment epithelium.

In accordance with a contemplated method, treatment of KSS may comprise transplantation of exogeneous isolated mitochondria directly to the eye, e.g., to an extraocular muscle, the vitreous and/or by systemic administration of isolated mitochondria.

In some embodiments, the ophthalmic disease or disorder is corneal clouding, a rare manifestation of KSS with corneal clouding associated with either congenital glaucoma or corneal dystrophy (degeneration). Structural changes in endothelium and Descemet's membrane have been reported with corneal edema that may be due to reduced pump action of corneal mitochondria. Treatment of corneal clouding, in accordance with a contemplated method, may comprise transplantation of isolated mitochondria directly to the eye, e.g., to the cornea and/or to the anterior chamber. Alternatively, or additionally, mitochondrial transfer to the eye may be by topical administration of eye drops.

Ophthalmologic diseases which are not considered as originating from primary mitochondrial diseases, are increasingly recognized to result, at least in part, from secondary, i.e., non-genetic, mitochondrial diseases or disorders (also referred to herein as "secondary mitochondrial dysfunction"), exemplified in a non-limiting manner by increased oxidative stress, and/or increased apoptosis, which are mediated by mitochondria. For example, oxidative damage that results over time from mtDNA instability leads to cumulative mitochondrial damage, which is recognized to be an important pathogenic factor in age-related ophthalmologic disorders such as diabetic retinopathy, age-related macular degeneration, and glaucoma.

A contemplated method may be applicable for the treatment of ophthalmic diseases, disorders or conditions associated with a secondary mitochondrial disease or disorder. For example, the ophthalmic disease, disorder or condition may be diabetic retinopathy, the leading cause of blindness in young adults. The pathogenesis of diabetic retinopathy involves progressive dysfunction of retinal mitochondria in the setting of hyperglycemia, with mtDNA damage and accelerated apoptosis occurring in retinal capillary cells. Matrix metalloproteinase-2 (MMP2) appears to be a central protein that mediates this process, as it becomes activated and pro-apoptotic in diabetic retinal cells. Activated MMP2 causes mitochondrial membrane degradation.

In a further example, the ophthalmic disease, disorder or condition treatable with a contemplated method is glaucoma, the second-leading cause of blindness worldwide. It is an optic neuropathy that manifests with optic nerve cupping and atrophy similar to what is observed in primary mitochondrial optic neuropathies. The optic nerve is packed with mitochondria, making it particularly susceptible to impairment of mitochondrial respiratory capacity that can selectively damage RGCs. Although mitochondrial function may be impaired by mutations in either nuclear or mtDNA genes in glaucoma, mechanical stress or chronic hypoperfusion caused by increased intraocular pressure, toxic xenobiotics, or even light-induced oxidative stress, play a major role is causing secondary mitochondrial dysfunction encountered in glaucoma patients.

Further classic ophthalmologic diseases characterized by secondary mitochondrial dysfunction are exemplified by maternally inherited diabetes and deafness, age-related macular degeneration (AMD), proliferative vitreo-retinopathy (PVR), and Fuchs dystrophy (in corneal endothelium). Any of these diseases may be treated by mitochondrial transplantation in accordance with a contemplated method disclosed herein.

Secondary mitochondrial dysfunction resulting directly or indirectly from external environmental factors such as local injury or trauma in the eye or exposure to toxic materials may lead to ophthalmic conditions or disorders. Such conditions may be acute or mild and may be treated by mitochondrial transplantation as described herein.

In some embodiments, the secondary mitochondrial dysfunction, which may be alleviated, relieved or cured is Ischemia. Ischemia is broadly defined as the loss of blood supply to a biological tissue, resulting in energy depletion and often even cell death, both of which are mediated by intermediate factors such as the release of excess excitatory amino acids, free-radical formation, and inflammation. Retinal ischemia is a common cause of visual impairment and blindness and is a characteristic feature of various clinical retinal disorders such as ischemic optic neuropathies, obstructive arterial and venous retinopathies, carotid occlusive disorders, retinopathy of prematurity, chronic diabetic retinopathy and glaucoma. A hallmark of these pathologies is the death of retinal ganglion cells.

Retinal ischemia occurs when the retinal circulation is insufficient to meet metabolic demands. It can be caused by general or, more commonly, by local circulatory failure. The metabolic demands of the retina are the highest of any tissue within the body, thus, maintaining a consistently high blood supply is essential.

There are many pathogenic mechanisms which contribute to the cell death cascades experienced during ischemia, such as energy failure, elevation of intracellular calcium, generation of free radicals, blood-retinal barrier disruption, inflammation and apoptosis. At least some of these mechanisms directly or indirectly affect mitochondrial function. Mitochondrial dysfunction ultimately leads to cell death.

Currently, no treatment is available for rescuing dying cells in acute ischemic insults, except for opening the occult artery that causes ischemia (if possible). Hence, a treatment that targets the compromised cells and improves their survival, and thus the patient prognosis, is an unmet need.

Embodiments described herein pertain to treatment of various forms of ischemic optic neuropathies, also interchangeably referred to herein as "ocular ischemic insults" by means of transplantation of intact, vital, functioning exogenous mitochondria to diseased parts of the eye. As shown in the Examples described herein, freshly isolated mitochondria injected in vivo to ischemic tissue, were internalized by compromised cells and protected them from death. It is assumed that a new reservoir of healthy mitochondria decreases ROS production within ischemic tissues, provides a new pool of intact, exogenous mitochondrial-DNA and increases energy production and calcium buffering capacity.

For example, a contemplated method may be useful in treatment of non-arteritic anterior ischemic optic neuropathy (NAION), central retinal artery occlusion (CRAO), or acute angle closure glaucoma (AACG).

In some embodiments, ophthalmic conditions such as local injury, trauma, dystrophy or disease in the cornea of the eye is treated, in accordance with the present disclosure, by curing mitochondrial dysfunction in the cornea induced directly or indirectly by such ophthalmic conditions.

The cornea is the transparent, outermost layer of the eye that plays a crucial role in focusing light onto the retina. The cornea has five layers: (1) epithelium: the outermost, protective layer of the cornea; (2) Bowman's membrane: a strong second protective layer; (3) stroma: the thickest layer of the cornea. It is made up of water, collagen fibers and other connective tissue. This strengthens the cornea and makes it flexible and clear; (4) Descemet's membrane: a thin, strong inner layer that is also protective; and (5) endothelium: the innermost layer made up of cells that pump excess water out of the cornea.

In some embodiments, mitochondria transplantation is applied to damaged epithelium of the cornea in a subject in need thereof.

Injury to the corneal epithelial surface can result in epithelial defects. Healing occurs in three distinct phases characterized by epithelial cell migration, proliferation, and differentiation. Trauma to the corneal epithelium induces migration of the remaining epithelial cells adjacent to the injury site toward the defective area. Changes in cell-cell and cell-matrix (fibronectin-integrin system) interactions and modulation of the extracellular matrix by newly expressed proteolytic enzymes play important roles.

Damage to the cornea can cause significant vision loss and is a major cause of blindness worldwide. For example, chemical injuries to the cornea can result in a range of complications such as corneal opacity, ulceration, and perforation. The severity of the injury depends on several factors such as the type, concentration, and duration of exposure to the injuring agent.

In some embodiments, damage to the cornea epithelium is caused by exposure to a chemical.

Chemical injuries to the eye are serious and potentially vision-threatening conditions that can result from exposure to a variety of substances such as acids, alkalis, and other corrosive agents. Among these, alkali injuries are more common and often cause more severe damage than acid injuries. Sodium hydroxide (NaOH) is one such corrosive alkali that can cause significant damage to the eye, particularly the cornea epithelium. Alkali agents such as NaOH are particularly damaging to the cornea because they can penetrate the tissue more deeply and cause liquefactive necrosis, which leads to rapid and extensive tissue damage. Corneal healing after chemical injury is often slow and incomplete and can result in long-term visual impairment or blindness.

Current treatments of alkali damages to the corneal epithelium include irrigation with copious amounts of water or saline, administration of topical medications such as antibiotics and corticosteroids and, in some cases, surgical interventions such as amniotic membrane transplantation or corneal transplantation. However, despite these treatments, the rate and completeness of corneal healing after chemical injury remains limited. Hence, there is a need for new and effective approaches to promote faster and more complete corneal healing after chemical injury.

The present inventors have shown that transplantation of mitochondria to the corneal epithelium layer significantly improved corneal healing after NaOH damage. In particular, the corneal epithelial wound closure rate observed was much faster in the group that received mitochondria transplantation compared to the control group without mitochondrial transplantation. In fact, as shown in Example 9 herein, the corneal wound treated with mitochondria transplantation closed completely after only 4 days, whereas in untreated eye, wound healing was no more than about 45%. H&E staining of corneas from control mice demonstrated broad damage including thinning and cell loss of the epithelial layer and thickening and disorganization of the stroma. However, corneas from mice transplanted with mitochondria had a multi-layered epithelium, and normal stroma thickness and organization, supporting a phenotype of repaired epithelium and proper corneal hydration. These findings suggest that mitochondria transplantation to the corneal epithelium layer can significantly improve the rate and completeness of corneal wound healing after chemical damage.

It is further demonstrated herein that transplantation of healthy mitochondria can lead to faster cell proliferation and improved wound healing in primary human corneal epithelial cells isolated from human corneas and cultured. As demonstrated in Example herein, mitochondria transplantation induced proliferation of human corneal epithelial cells by approximately 15-20%. The wound healing effect of mitochondria transplantation is therefore likely a combination of enhanced proliferation, migration and potentially cell survival mechanisms.

Thus, it has been successfully demonstrated by the present inventors, and for the first time, that transplanted mitochondria is highly effective in corneal wound healing. Furthermore, this approach demonstrated minimal adverse effects, making it a potentially safe and effective treatment for ocular injuries such as retinal and corneal injuries.

As used herein, the terms "damaged cornea epithelium" and "corneal wound" are interchangeable.

Corneal epithelial defects treatable by a disclosed method can occur by a variety of other means, such as, but not limited to: dry eye and decreased tear production (due to side effects of topical or systemic medications, Sjogren's syndrome, vitamin A deficiency, and the like); mechanical trauma (e.g., fingernail scratch, edge of contact lens, foreign body in the lid/fornices; trichiasis, a common eyelid problem, wherein eyelashes grow inwards toward the eye, rub against the cornea, the conjunctiva, and the inner surface of the eyelids, and irritates the eye; distichiasis, an eyelash abnormality where an extra set of eyelashes have grown in the wrong place on the eyelids; neurotrophic diseases causing incomplete lid closure (such as palsy of the 7th cranial nerve or Bell's palsy); restrictive eyelid diseases; proptosis/exophthalmos, characterized by the bulging or protruding of one or both eyes from their natural position; decreased consciousness in drug abuse or comatose state; blepharoplasty (a surgical rejuvenating procedure that may be performed on the upper and/or lower eyelids) that overcorrects ptosis; lagophthalmos characterized by incomplete or abnormal closure of the eyelids; exposure during long surgeries under general anesthesia; ultraviolet burns (e.g. welding, prolonged exposure to the sun or reflective surfaces); limbal stem cell deficiency (failure to regenerate epithelial cells may be due to chronic contact lens wear, chemical burns, a history of ocular surgery, ocular autoimmune degenerations, and the like); topical anesthetic abuse; neurotrophic keratopathy (e.g., corneal hypoesthesia or anesthesia caused by damage to the trigeminal nerve, HSV, VZV, diabetes, topical drop toxicity, and the like); and infection (bacteria and other organisms can invade the cornea through the epithelium causing epithelial defects or ulcers).

Further cornea epithelium pathologies treatable by a disclosed method include corneal abrasion, recurrent erosion syndrome, and corneal dystrophies involving mitochondrial dysfunction in their pathogenesis, such as certain types of epithelial basement membrane dystrophies associated with erosion, and Fuchs' dystrophy, a posterior corneal dystrophy that affects the innermost parts of the cornea: the endothelium and the Descemet membrane.

In corneal dystrophies, foreign material builds up in one or more of the five layers of the cornea. The material may cause the cornea to lose its transparency, leading to loss of vision or blurred vision. Most corneal dystrophies affect both eyes. They progress slowly and run in families.

Recurrent corneal erosion (RCE) syndrome is a common, recurrent dystrophy caused when the epithelium layer loosens from the layer underneath (Bowman's membrane). This abnormal epithelial adhesion to the underlying basal lamina may cause the sudden onset of mild to severe pain in the eye, light sensitivity, blurred vision, tearing and the feeling of a foreign object in the in the eye, typically upon awakening.

A corneal abrasion (also called scratched eye or scratched cornea) is an eye injury that causes significant discomfort, photophobia, and erythema. This may occur spontaneously or when there is a disruption of the corneal epithelium caused by contact lenses.

The state-of-the-art treatment or management of the above-mentioned corneal pathologies may be either medical (e.g., lubricating eye drops, antibiotic ointments) or surgery to remove the damaged epithelium and promote healing. The transplantation of healthy mitochondria can restore cellular respiration and energy production, leading to faster cell proliferation and improved wound healing. Furthermore, as demonstrated herein, this approach has minimal adverse effects, making it a potentially safe and effective treatment for corneal injury.

In some embodiments, the administered mitochondria in accordance with a contemplated method, are freshly isolated mitochondria.

An effective amount or a therapeutically effective amount of exogenous, e.g., fresh, mitochondria, as referred to herein, is a quantity, e.g., number or concentration of isolated mitochondria, which is sufficient to achieve a desired effect in a subject being treated. An effective amount of isolated mitochondria can be administered in a single dose, or in several doses, for example, once or several times, during a course of treatment. For example, mitochondrial transplantation may be provided to a patient only one time, for example, in treatment of an acute ophthalmic pathology. Alternatively, or additionally, mitochondrial transplantation may be provided, for example, once a week, once a month, once in two months, once in 6 months, once a year, once in two years, and the like, for example, when treating a chronic pathology of the eye. However, the effective amount of the isolated mitochondria will depend on the state of the mitochondria applied, the subject being treated, the severity and type of the affliction, and the manner of administration of the transplant.

In some embodiments, the therapeutically effective amount of purified, isolated mitochondria administered, e.g., directly to the eye, in accordance with a contemplated method, is in the range of from about $10^4$ to about $10^{10}$, for example, from about $10^4$ to about $10^5$, from about $10^5$ to about $10^6$, from about $10^5$ to about $10^7$, from about $10^6$ to about $10^{10}$, from about $10^6$ to about $10^8$, from about $10^6$ to about $10^7$, from about $10^7$ to about $10^{10}$, from about $10^7$ to about $10^9$, from about $10^8$ to about $10^{10}$, from about $10^8$ to about $10^9$, from about $10^9$ to about $10^{10}$ or more, of isolated, e.g., fresh, mitochondria.

In exemplary embodiments, fresh, isolated mitochondria are administered intravitreally in an effective amount of from about $10^6$ to about $10^7$ mitochondria, e.g., in a single dose.

In systemic administration, a therapeutically effective amount of exogenous mitochondria is in the range of from about 0.1 to about 1.5 mg/kg body weight, for example, from about 0.1 to about 0.5, from about 0.2 to about 0.5, from about 0.3 to about 0.6, from about 0.3 to about 0.8, from about 0.4 to about 0.5, from about 0.4 to about 0.7, from about 0.5 to about 0.6, from about 0.5 to about 0.8, from about 0.6 to about 0.9, from about 0.6 to about 1.1, from about 0.8 to about 1.2, from about 0.8 to about 1.0, or from about 0.9 to about 1.5 mg/kg body weight.

In some exemplary embodiments, the amount of exogenous isolated, e.g., fresh, mitochondria systemically administered is from about 0.4 to about 0.7 mg/kg body weight, or about 0.5 mg/kg body weight.

As appreciated by a skilled person, excess mitochondria transplantation is to be avoided because it may cause inflammation and fibrosis of the retina and vitreous.

Treating a disease, as referred to herein, means ameliorating, inhibiting the progression of, delaying worsening of, and even completely preventing the development of a disease. Treatment refers to a therapeutic intervention that ameliorates a sign or symptom of a disease or a pathological condition after it has begun to develop. In particular examples, however, treatment is similar to prevention, except that instead of complete inhibition, the development, progression or relapse of the disease is inhibited or slowed. Preventing a disease refers to inhibiting the full development of a disease, for example inhibiting vision loss due to ischemic insult.

"Administration", as referred to herein, is introduction of the isolated mitochondria or a formulation comprising it, as defined herein, into a subject by a chosen route. Administration of the isolated mitochondria or of a formulation can be by any route known to one of skill in the art, and as appropriate for the particular condition and location under treatment. Administration can be local or systemic.

Examples of local administration pertaining to the present disclosure include, but are not limited to, intravitreal injection, intra ocular-muscle administration, injection into the anterior chamber, injection into the suprachoroidal space, injection into the limbus, retro bulbar injection, sub-tenon injection, subconjunctival injection, intracorneal injection, and topical application to the surface of the eye (for example, by designated eye drops). In addition, local administration includes routes of administration typically used for systemic administration, for example by directing intravascular administration to the arterial supply of the eye. Thus, in particular embodiments, local administration includes intra-arterial administration and intravenous administration when such administration is targeted to the vasculature supplying the eye.

All these routes of administration expose different cells to the exogenous mitochondria: in intravitreal administration (e.g., injection), RGC and maybe other cells in the inner retina are exposed to the exogenous mitochondria; in anterior chamber injection, corneal endothelium and other cells in the anterior chamber are exposed to the exogenous mitochondria; in suprachoroidal or sub-retinal space injection, choroid cells, RPE and photoreceptors are exposed to the exogenous mitochondria; in application to the surface of the eye, corneal epithelium is exposed to the exogenous mitochondria; and in intravenous administration, exogenous mitochondria can reach any ocular site if the retinal blood barrier does not exist or if it is defected such as in diabetic retinopathy.

In some embodiments, exogenous mitochondria are administered via intravitreal injection (see FIG. 1B). Alternative or additional modes of ocular administration of mitochondria are schematically presented in FIG. 1C.

Systemic administration includes any route of administration designed to distribute an active compound, e.g., isolated mitochondria, widely throughout the body via the circulatory system. Thus, systemic administration includes, but is not limited to intra-arterial and intravenous administration. Systemic administration also includes subcutaneous administration, or intramuscular administration, when such administration is directed at absorption and distribution throughout the body by the circulatory system.

Pharmaceutical Compositions and Formulations

The present disclosure, in an aspect thereof, is related to a pharmaceutical composition comprising isolated mitochondria and a pharmaceutically acceptable excipient. In some embodiments, the composition is a formulation for pharmaceutical administration and comprises a pharmaceutically acceptable carrier.

The term "pharmaceutical composition", as used herein, refers to a composition essentially comprising isolated mitochondria, which may be adjusted for medicinal utilization such as therapeutic or diagnostic utilization. "Formulation", as used herein, refers to any mixture of different components or ingredients, at least one of which is mitochondria, e.g., autologous or allogeneic freshly isolated and purified mitochondria, prepared in a certain way, i.e., according to a particular formula so as to be applicable for administration to a subject. Such a formulation is termed herein "mitochondrial formulation". For example, a mitochondrial formulation may be formulated for mitochondrial transplantation, and may include mitochondria combined or formulated together with, for example, one or more carriers, excipients, stabilizers and the like. Usually, a mitochondrial formulation comprises one or more pharmaceutically and physiologically acceptable carriers, which can be administered to a subject (e.g., human or non-human subject) in a specific form, such as, but not limited to, infusion, injection or eye drops. The mitochondrial formulation may further comprise other active agents such as anti-inflammatory agents, antibiotics and the like. For example, a mitochondrial formulation may comprise an agent which promotes mitochondrial biogenesis, such as erythropoietin (EPO) or a salt thereof, for example, recombinant human erythropoietin or isolated human erythropoietin.

As used herein, the terms "pharmaceutically acceptable", and "physiologically acceptable" are interchangeable and mean approved by a regulatory agency of the Federal or a state government or listed in the U.S. Pharmacopeia or other generally recognized pharmacopeia for use in animals, and more particularly in humans. These terms include formulations, molecular entities, excipients, carriers and compositions that do not produce an adverse, allergic or other untoward reaction when administered to an animal, or a human, as appropriate. For human administration, preparations should meet sterility, pyrogenicity, general safety and purity standards as required by, e.g., the U.S. Food and Drug Administration (FDA) agency, and the European Medicines Agency (EMA).

Herein the term "excipient" refers to an inert substance added to a pharmaceutical composition or formulation to further facilitate process and administration of the active ingredients. "Pharmaceutically acceptable excipients", as used herein, encompass approved preservatives, antioxidants (e.g., ascorbic acid (vitamin C) or a salt thereof; cysteine or a cysteine derivative; lipoic acid; uric acid; carotenes; α-tocopherol (vitamin E); and ubiquinol (coenzyme Q)), surfactants (e.g., Tween®-20, Tween®-40, Tween®-60 and Tween®-80), a buffer (e.g., citrate buffer, acetate buffer, sodium acetate buffer, tartrate buffer, Tris buffer, glycine buffer, sodium buffer, sodium hydroxide buffer, or a mixture thereof), coatings, isotonic agents, absorption delaying agents, carriers and the like, that are compatible with pharmaceutical administration, do not cause significant irritation to an organism and do not abrogate the biological activity and properties of a possible active agent. Physiologically suitable carriers in liquid formulations may be, for example, solvents or dispersion media. The use of such media and agents in combination with mitochondria is well known in the art.

A disclosed formulation may be used for mitochondrial transplantation in accordance with any of the methods described herein.

Kits

In still a further aspect, the present disclosure relates to a kit comprising isolated mitochondria or a formulation comprising isolated mitochondria, as defined herein, and, optionally, instructions and means for administration of the mitochondria and/or the formulation to a subject in need thereof.

A contemplated kit is useful for treatment of mitochondrial dysfunction, mitochondrial destruction or depletion in the eye of a subject and any ophthalmic disease, disorder or condition and/or any ocular manifestation of a disease or condition associated with mitochondrial dysfunction in the eye as described herein.

In some embodiments, a contemplated kit is useful for treatment of ischemic insult in the eye.

As used herein the term "about" refers to ±10%.

The terms "comprises", "comprising", "includes", "including", "having" and their conjugates mean "including but not limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosure may be presented in a range format. It should be understood that the description in range format is merely for convenience and brevity and should not be construed as an inflexible limitation on the scope of the description. Accordingly, the description of a range should be considered to have specifically disclosed all the possible subranges as well as individual numerical values within that range. This applies regardless of the breadth of the range.

Various embodiments and aspects of the present disclosure as delineated hereinabove and as claimed in the claims section below find experimental support in the following examples.

EXAMPLES

Reference is now made to the following examples, which together with the above descriptions illustrate some embodiments of the disclosure in a non-limiting fashion.

Generally, the nomenclature used herein, and the laboratory procedures utilized in the present disclosure include molecular, chemical, biochemical, microbiological and/or recombinant DNA techniques. Such techniques are thoroughly explained in the literature. See for example, Guide to Research Techniques in Neuroscience (Second Edition), Matt 2015; Elsevier's Integrated Review Biochemistry (Second Edition), 2012. Other general references are provided throughout this document. The procedures therein are believed to be well known in the art and are provided for the convenience of the reader. All the information contained therein is incorporated herein by reference.

Materials and Methods

Animals

Male C57BL/6 mice aged 8-10 weeks and weighing 20-25 gr were used. The mice were housed in the Kaplan Medical Center animal facility at 21-22° C. with 12/12-hour light-dark cycles.

All experiments and animal care procedures were conducted in accordance with the Association for Research in Vision and Ophthalmology (ARVO) statement for use of animals in ophthalmic and vision research, under the supervision of a health authority-accredited staff member for animal care and management in Kaplan Medical Center. In addition, the research protocol was approved by the national animal care and use committee (approval ID IL-18-8-241).

Cell Culture

Human neuroblastoma SH-SYSY cells, originally derived from a metastatic bone tumor biopsy and differentiated to a neuron-like phenotype, are herein referred to as "neuronal cells". Human adult retinal pigment epithelial cell line-19 (ARPE-19), are a spontaneously arising retinal pigment epithelia cell line. Both SH-SYSY and ARPE-19 cells were grown in DMEM-F12 media, supplemented with 10% FBS, 1% glutamine, 200 U/ml penicillin and 200 mg/ml streptomycin. Human corneal endothelial cells (hCECs) were isolated from the limbus of human corneas, meaning that they originate from limbal cells. hCECs were grown in DMEM media, supplemented with 5% FBS, 1% glutamine, 200 U/ml penicillin and 200 mg/ml streptomycin. Cells were maintained at 37° C. in a humidified atmosphere containing 95% air and 5% $CO_2$.

Mitochondrial Isolation

Mitochondria were either isolated from ARPE-19 cell-line for in-vitro studies, or from mouse liver for in-vivo experiments, according to published protocols (see, for example, Wieckowski et al., 2009, *Nature Protocols* 4:1582-1590; and Frezza et al., 2007, *Nature Protocols* 2:287-295).

For liver mitochondria isolation, before each experiment, and following overnight fasting, C57BL/6 mice were anesthetized using CO 2 and euthanized by cervical dislocation. The liver was harvested and immediately washed with ice-cold IB-1 buffer (225 mM mannitol, 75 mM sucrose, 30 mM Tris-HCl, 0.5% fatty acid free bovine serum albumin (FA-free BSA), 0.5 mM EGTA, pH 7.4) and weighed. Then, the liver was rinsed in IB-3 buffer (225 mM mannitol, 75 mM sucrose, 30 mM Tris-HCl, pH 7.4), cut into small pieces using scissors, transferred to a glass potter in IB-1 buffer and homogenized gently 10 times to break cellular membranes. An aliquot of 100 µl was kept aside and served as an 'input' control for Western blot (WB) analysis. The homogenate was centrifuged once or twice at 750 g for 10 min at 4° C., and the supernatant was separated and centrifuged at 10,000 g for additional 10 min at 4° C. The supernatant containing the cytosolic fraction was kept for WB analysis. The pellet, which contained the mitochondria was gently re-suspended in IB-2 buffer (same as IB-1 but without EGTA) and centrifuged again at 10,000 g for 10 min at 4° C. The supernatant was discarded, and the mitochondrial pellet was kept on ice and used within 3-4 hours.

For in-vitro studies, approximately $250 \times 10^6$ ARPE-19 cells were collected from $8 \times 15$ cm dishes and mitochondria were isolated in a similar way.

Typically, 4-10 mg of mitochondria, $\sim 1 \times 10^9$, were obtained from $\sim 1$ gr mouse liver tissue, and 0.2-1 mg, $\sim 1 \times 10^9$ mitochondria were obtained from 8 confluent 150 mm tissue culture plates of human ARPE-19 cells ($\sim 12 \times 10^7$ cells/plate).

Western Blot

Western blotting, as referred to herein, also known as immunoblotting (because antibodies are used for specifically detecting their antigens) or protein blotting, is a core technique useful in separating and identifying proteins from a complex mixture of proteins extracted from cells. The term "blotting" refers to the transfer of a biological sample from a gel to a membrane and its subsequent detection on the surface of the membrane. The technique is based on three main steps: (1) separation of cell extract (or homogenate) proteins by molecular weight (and thus by type) through gel electrophoresis, for example, using agarose gel having a lower acrylamide concentration such as sodium dodecyl sulfate polyacrylamide gel electrophoresis (SDS-PAGE); (2) transfer to a solid support (membrane) such as nitrocellulose or polyvinylidene difluoride (PVDF), which produces a band for each protein; and (3) identifying specific desired proteins by incubating the membrane with antibodies specific to the proteins of interest (herein referred to as "primary antibodies"), and labelling the antibodies by the use of secondary, e.g., fluorescently or otherwise labelled, antibodies. The bound antibodies may be detected, for example, by developing the film and/or by using a designated analysis kit. As the antibodies only bind to the protein of interest, only one band should be visible for a specific protein. The thickness of the band corresponds to the amount of protein present. Multiplexing fluorescent western blotting enables multiple proteins to be detected and quantified in a single sample. Direct protein abundance comparisons and normalization may be conducted against a control, for instance a protein encoded by a housekeeping gene.

In the present disclosure, 30 µg of mitochondrial proteins were resolved (separated) on SDS-PAGE gel and transferred to nitrocellulose membrane and, after reaction with the desired antibodies, were developed using EZ-ECL chemiluminescence detection kit (Biological Industries). This kit is applied to membrane-immobilized proteins conjugated with horseradish peroxidase (HRP) directly or indirectly. In the presence of hydrogen peroxide ($H_2O_2$), HRP catalyzes the oxidation of cyclic diacylhydrazides such as luminol and excites them. The intermediate reaction product, which is in its excited state, decays to the ground state by emitting light.

The following primary antibodies were used: mouse anti cox-4 (bs-10257R, Bioss Antibodies, 1:200) specific to a mitochondrial protein, and rabbit anti β-actin (A5441, Sigma-Aldrich, 1:5000) specific to a cytosolic, non-mitochondrial protein. Secondary antibodies used were HRP-conjugated secondary antibodies (Jackson ImmunoResearch).

ATP Production

Isolated mitochondria were diluted 1:100 in respiration buffer (~0.5 mg/ml mitochondria per vial). Succinate (5 mM) was added as an electron donor to all vials. Basal ATP production, ADP-induced respiration and mitochondrial ATP production (150 µM ADP as substrate) were determined using ATPlite™ luminescence assay kit (PerkinElmer®, US), according to manufacturer instructions. The ATPlite™ assay system is based on production of light caused by reaction of ATP with added D-luciferin in the presence of luciferase. The emitted light is proportional to the ATP concentration (within certain limits).

Oligomycin (10 µM), an inhibitor of ATP synthase, was used as a control to validate mitochondrial-dependent ATP production.

Luminescence was measured by a microplateplate reader (Tecan, Switzerland).

Mitochondrial Respiration

Oxygen consumption studies were performed using a Clark type electrode (Hansatech Instruments, UK) as described in Rustin et al. (Rustin et al., 1994, *Clinica chimica acta; International J Clinical Chemistry* 228:35-51), and according to the manufacturer instructions. Briefly, oxygen dissolved in the reaction vessel of a liquid-phase system was detected polarographically by the 51 Clark-Type electrode. This oxygen electrode disc comprises a relatively large (2 mm diameter) platinum cathode and a concentric silver anode immersed in and linked by an electrolyte solution, also termed herein "respiration buffer". The electrodes are protected by a thin PTFE (Teflon) membrane which is permeable to oxygen. When a small voltage is applied across these electrodes such that the platinum is made negative with respect to the silver, the current which flows is at first negligible and the platinum becomes polarized (i.e., it adopts the externally applied potential). As this potential is increased to 700 mV, oxygen is reduced at the platinum surface, initially to hydrogen peroxide $H_2O_2$. The polar platinum electrode discharges as electrons are donated to oxygen, which acts as an electron acceptor. The current which then flows is stoichiometrically related to the oxygen consumed at the cathode. It is converted to a digital signal and recorded by an electrode control unit.

Isolated mitochondria (0.4-0.6 mg) were measured in a respiration buffer comprising 225 mM mannitol, 75 mM sucrose, 2 mM HEPES, 5 mM $KH_2PO_4$, 5 mM $MgCl_2$, 1 mM EDTA and 0.1% FA-free BSA, pH 7.4, at 37° C. Succinate (5 mM) was used as a substrate, which feeds its electrons into the respiratory chain via complex II (state II respiration). Rotenone (2 µM) was added to inhibit complex I activity and to prevent succinate-driven reverse electron transfer. To induce state III (complex III) respiration, 150 µM ADP were added to the chamber, and the oxygen consumption was recorded until ADP levels decreased (state IV) and the respiration returned to a rate comparable to state II.

Optic Nerve Crush (ONC) Retinal Ischemic Model

Mice were placed under general anesthesia by intraperitoneal injection of combined ketamine/xylazine (80 mg/kg and 8 mg/kg, respectively), supplemented by topical ophthalmic anesthesia (proparacaine hydrochloride 0.5%). For inducing retinal ischemia, the right optic nerve was crushed by applying forceps at 2.5 to 3.0 mm posterior to the globe for 7 seconds; this procedure was repeated three times (see, further description, for example, in Rappoport et a., 2013, *Investigative Ophthalmology & Visual Science* 54:8160-8171). Three groups of mice were tested: (1) mice experiencing optic nerve crush followed immediately by a single intravitreal injection of 1 or 10 million fresh mitochondria isolated from mouse liver, suspended in 10 µl PBS; (2) mice experiencing ONC followed immediately by a single intravitreal injection of 10 µl PBS. These mice served as a sham (false) control; and (3) mice that were injected with 1 or 10 million mitochondria without performing ONC. The left eye of each mouse in all groups served as a control. The intravitreal injections of mitochondria were performed in a standardized manner under direct ophthalmoscopic control with an operating microscope (Zeiss S3, Germany). Mice were euthanized by carbon dioxide 1 or 14 days after injury. For fixation, 4% paraformaldehyde was perfused via the vascular circularity system, the eyes were enucleated and kept in formalin until used.

Whole Mount Retina Preparation

The retina is a thin sheet of nervous tissue that lines the back of the eye. It processes the optical image of the visual field, transforming light energy into electrical signals (i.e., phototransduction) to form a neural image interpretable by the rest of the brain. Retinal ganglion cells (RGCs) populate the ganglion cell layer (GCL) of the retina (see FIGS. 2A-2B depicting a schematic presentation (2B), and optical coherence tomography (OCT) image (2A) of layers of the retina). Retinal ganglion cells are the bridging neurons that connect the retinal input to the visual processing centers within the central nervous system. There is a remarkable diversity of RGCs and the various subtypes have unique morphological features, distinct functions, and characteristic pathways linking the inner retina to the relevant brain areas.

Retina is one of the most easily accessible parts of the central nervous system in vertebrates. The retinal wholemount technique is a useful method of assessing the structure, arrangement and sampling of retinal neurons in vertebrate eyes. Numerous visual parameters can be determined with the wholemount technique, including spatial resolving of ganglion cells spacing and integrity. Using wholemounts, total absolute counts of RGC number, and acceptable estimates of percentage differences in RGC numbers between treatment and control groups may be calculated.

Wholemount retina were prepared from 4% paraformaldehyde (PFA) fixed eyes according to the protocol described by Ivanova et al. (Ivanova et al., 2013, *J. Visualized Experiments, JoVE:e*51018). In brief, a mouse was euthanized, and his eyes were enucleated, washed 3 times with 1 ml PBS and placed in a 6 cm dish in PBS. Under a microscope (Zeiss S3, Germany), the cornea, the lens and the vitreous were removed. Then, a small cut was made underneath the RPE layer, and the neuro-retina was gently separated from the eyecup. When the entire retina was used, small incisions were made from the periphery, halfway to the optic nerve. These incisions helped in making a flat preparation. Retinae were flattened onto glass slides (SuperFrost™ slides of Thermo Scientific™)

Mitochondrial Staining and Uptake Evaluation

For in-vitro mitochondrial uptake assessment, 30,000 SH-SY5Y cells were seeded on cover slips in a 24 wells plate. On the next day, isolated mitochondria from ARPE-19 cells were labeled (stained) with 200 nM MitoTracker® Red CMXRos dye (M7512, Invitrogen™ Molecular Probes™ CA, USA), herein designated "MTR". MTR is a red-fluorescent dye that accumulates and stains mitochondria in live cells, depending upon the mitochondrial transmembrane potential (O m), thereby being indicative of mitochondrial function. The dye is well-retained after aldehyde fixation. The MTR labeled mitochondria (about $2.5 \times 10^6$) were added to the SH-SY5Y cells. Twenty-four hours later, cells were fixed with 4% PFA for 10 mins, washed with PBS, and subjected to immunostaining as described herein below.

For in-vivo uptake evaluation, mouse liver isolated mitochondria were labeled (stained) with 200 nM MTR, and 1 or 10 million of the labeled mitochondria were injected intravitreally immediately following optic nerve crush (ONC). Twenty-four hours after injection, mice were euthanized, perfused with 4% PFA, and their eyes were enucleated. Whole mount retina or paraffin embedded eye sections were prepared and subjected to immunostaining as described herein below.

Histological and Immunostaining

Histological staining of cells, most of which are colorless and transparent, usually employs a dye that stains some of the cell components a bright color, together with a counterstain that stains the rest of the cell a different color. Acidic dyes react with cationic or basic components (also termed "acidophilic") in cells such as proteins and other components in the cytoplasm. Basic dyes react with anionic or acidic components (also termed "basophilic") in cells, for example, nucleic acids. The staining system termed "H&E staining", contains two dyes: the basic dye haemotoxylin and the acidic dye eosin. Eosin stains acidophilic structures (e.g., cytoplasmic proteins, cytoplasmic filaments in muscle cells, intracellular membranes, and extracellular fibers) red or pink. Haematoxylin is used in combination with aluminum ions ($Al^{3+}$) for staining basophilic structures (e.g., the nucleus and parts of the cytoplasm that contain RNA (e.g., ribosomes and the rough endoplasmic reticulum)) purplish blue.

For histological staining, 4 µm paraffin embedded eye sections were stained with H&E according to standard staining protocol (see, for example, Rappoport et a., 2013, *Investigative Ophthalmology & Visual Science* 54:8160-8171) for light microcopy assessment (Nikon TS100, Japan). RGCs were counted using Image) software (in a×40 magnification field) for three consecutive sections of every 7 to 10 slides of each eye, and the mean number was calculated.

Immunostaining or immunohistochemistry (IHC) combines anatomical, immunological and biochemical techniques to image discrete components in tissues by using appropriately labeled antibodies to bind specifically to their target antigens in situ. IHC makes it possible to visualize and document the high-resolution distribution and localization of specific cellular components within cells and within their proper histological context. IHC methodology includes two main steps: sample preparation and sample staining. Tissue preparation or fixation is essential for the preservation of cell morphology and tissue architecture. Traditional IHC is based on the immunostaining of thin sections of tissues attached to individual glass slides. Immunostained slides are prepared, processed, and stained either manually or automatically for high-throughput sample preparation and staining. Samples can be viewed by either light or fluorescence microscopy.

Immunostaining of wholemount retinae was performed as described, for example, in Mead et al., 2014, PloS one 9:e110612. Briefly, retinae were permeabilized in 0.5% Triton x-100 in PBS for 15 min at −70° C. and then washed at room temperature with 0.5% Triton x-100 for a further 15 min. Retinae were incubated with primary antibodies diluted in wholemount antibody diluting buffer (wADB; 2% bovine serum albumin, 2% Triton x-100 in PBS) overnight at 4° C. and, the following day, were washed 3×10 min in PBS and incubated with secondary antibodies in wADB for 2 h at room temperature. After 2 h, retinae were washed for 3×10 min in PBS and mounted, the ganglion cell layer (GCL) uppermost, on glass slides in mounting medium (GBL labs), and cover slips were applied. Retina was immunostained for Tuj1, a neuron-specific class III β-tubulin, for marking ganglion cells. Other antibodies employed are detailed below.

For immunostaining of paraffin sections, de-paraffinization and antigen retrieval were performed according to standard protocol, before applying immunostaining.

The following antibodies were used: mouse anti-cox4 (bs-10257R, Bioss Antibodies, MA, USA 1:200), rabbit anti-β-actin (A5441, Sigma-Aldrich, 1:50), chicken anti-3-tubulin III/Tuj1 (GTX85469, GeneTex, CA, USA), and fluorescent secondary antibodies (Jackson ImmunoResearch, PA, USA).

Fluorescent images were taken using fluorescent microscope (Nikon TS100, Japan). Confocal images were observed under confocal laser-scanning microscope Zeiss LSM 510.

4', 6-diamidino-2-phenylindole (DAPI) is a fluorescent stain which binds preferentially to the AT-rich regions of dsDNA. DAPI staining visualizes nuclear DNA in both living and fixed cells and is used for determining the number of nuclei and for assessing gross cell morphology. In embodiments described herein, DAPI staining was used to label nuclei.

Flow Cytometry

Flow cytometry is an analytical cell-biology technique that utilizes light to count and profile cells in a heterogenous fluid mixture. Flow cytometry analysis was used to evaluate mitochondrial internalization into neurons. For assessing mitochondrial internalization, $5 \times 10^4$ SH-SY5Y cells were seeded in 12 wells plates in 1 ml media and incubated over night at 37° C. and 5% CO 2. On the next day, mitochondria isolated from ARPE-19 cells, were stained with 200 nM MitoTracker® Green-Fixable Mitochondrion dye (M-7514, Invitrogen™ Molecular Probes™ CA, USA), termed herein "MTG", and added to the SH-SY5Y neuronal cells for 18 h. SH-SY5Y cells of one well were stained for endogenous mitochondria with 500 nM MTG and served as a positive control. These cells were not transplanted with exogenous mitochondria. For staining, the cells were incubated with the dye, which passively diffused across the plasma membrane and accumulated in mitochondria. Mitochondria in cells stained with nanomolar concentrations of MTG exhibit bright green, fluorescein-like fluorescence. The MTG dye is nonfluorescent in aqueous solutions and becomes fluorescent only once it accumulates in the lipid environment of mitochondria. Hence, background fluorescence is negligible, enabling to clearly visualize mitochondria in live cells immediately following addition of the stain, and without a wash step.

Cells were trypsinized and collected into fluorescence-activated cell sorting (FACS) tubes, centrifuged at 1,400 g for 5 min and resuspended in PBS enriched with 1% fetal bovine serum (FBS). The mean intensity of the cellular MTG fluorescence was measured on a CytoFlex instrument (Beckman Coulter, USA) at excitation/emission wavelengths of 488/530 nm. Cell viability was simultaneously evaluated by staining with DRAQ7™ (BD Biosciences, US) and measuring its fluorescence at excitation/emission wavelengths of 488/644 nm. Dead cells (DRAQ7 positive cells) were excluded from the analysis. DRAQ7™ (Deep Red Anthraquinone 7) is a far-red fluorescent DNA dye, which is cell impermeable and is used to stain dead cells only in viability tests. DRAQ7™ has an excitation wavelength maximum of 599/644 nm but can also be suboptimally excited by the 488 nm wavelength laser.

Data were analyzed using CytoExpert 2.2 software and presented as the mean fluorescence intensity of the live cells.

Example 1

Isolation and Purification of Active Mitochondria

Mitochondria for transplantation were isolated form mouse liver and their purity and quality were evaluated by Western blotting as described in Materials and Methods.

As shown in FIG. 3A, the purified mitochondrial fraction was enriched with the mitochondrial protein cytochrome c oxidase (Cox4) and was depleted of the cytosolic marker protein β-actin, which appeared in the cytosolic fraction (cyto), demonstrating a pure mitochondrial preparation. Both markers appeared in the input sample before fractionation.

Next, mitochondrial function, i.e., respiration, was assessed by measuring oxygen consumption in the purified mitochondria using a Clark oxygen electrode, following addition of a substrate (succinate) and ADP, or rotenone (an inhibitor of succinate-driven respiration), as described in Materials and Methods. The results presented in FIG. 3B demonstrate that the mitochondria were indeed functional.

Mitochondrial activity was further confirmed by measuring ATP levels, and the results are presented in FIG. 3C. Mitochondria alone (Mito) showed base line ATP production. Addition of ADP substrate (Mito-ADP) substantially increased ATP levels, while introduction of oligomycin (Mito-ADP), an ATP-synthase inhibitor, dramatically reduced ATP levels, indicating appropriate ATP production capability of the isolated mitochondria. Finally, isolated mitochondria were labeled with MitoTracker® Green (MTG) Fixable Mitochondrion (FM) dye (M-7514, Invitrogen™ Molecular Probes™ CA, USA), which stains mitochondria regardless of their membrane potential, as well as with MitoTracker® Red CMXRos (MTR dye) (M7512, Invitrogen™ Molecular Probes™ CA, USA), which depends upon membrane potential for its accumulation. As is shown in FIG. 3D, almost all mitochondria were stained with both dyes, indicating intact membrane potential. Mitochondrial membrane potential (O m) is a key indicator of mitochondrial activity because it reflects the process of electron transport and oxidative phosphorylation, the driving force behind ATP production. Depolarization below a certain $\Delta\psi_m$ may indicate impaired mitochondrial function.

These results demonstrate successful isolation of pure and active mitochondria.

Example 2

In Vitro Uptake of Isolated Mitochondria by Various Cells

Having established a method for isolation of active mitochondria, fresh isolated mitochondria were tested for their ability to enter various cell types: human neuronal SH-SY5Y cells, and cell types of ocular origin such as human adult retinal pigment epithelial cell line-19 (ARPE-19), human corneal endothelial cells (hCEC), and mouse RGC cells (661W). Mitochondria were isolated from ARPE-19 cells or from mouse live as described in Material and Method, and their vitality (oxygen consumption, membrane potential) and activity (ATP production) was assessed as described in Example 1 above. Mitochondria were labeled with MTG for flow cytometry or with MTR for microscopy, and incubated with the cells for 24 h. For fluorescence microscopy, human SH-SY5Y neuronal cells were fixed and stained for the cytosolic protein β-actin, and for the endogenous mitochondrial protein Cox4.

Flow cytometry analysis demonstrated an uptake of mitochondria by the neuronal (SH-SY5Y) cells (FIG. 4A). Neurons transplanted with exogenous mitochondria showed an increase in fluorescence compared to non-stained negative control neurons. Neurons not transplanted with mitochondria and stained for their endogenous mitochondria with MTG served as a positive control, and unstained SH-SY5Y cells not transplanted with exogenous mitochondria served as negative control.

The uptake of mitochondria was also observed using fluorescence microscopy. Immunofluorescence staining shown in FIG. 4B demonstrated uptake of purified mitochondria stained with MTR (Mito; upper left image; red spots) by neuronal cells immunostained for β-actin to mark cytosolic, non-mitochondrial protein (Actin, upper middle image; green) and for Cox4 to mark endogenous mitochondria (Cox4,lower middle image; light blue), and further nuclear stained with DAPI (upper right image; blue). As shown in FIG. 4B, lower right image (Merge), MTR-stained exogenous mitochondria were found in the neurons cell body, indicating mitochondrial uptake. The arrow in the lower right panel shows exogenous mitochondria translocated into axons in a so-called "neuronal process". A neuronal process refers to a projection from the cell body of a neuron that can be either an axon or a dendrite. Neuronal processes are characterized by localization of mitochondria in distal axons or dendrites, namely, long extensions far from the cell body, in order to increase neurons survival after injury. Three-dimensional viewing of confocal planes showed close localization of exogenous (red) and endogenous (yellow) mitochondria (FIG. 4C), confirming the internalization of exogenous mitochondria by the cells, in close proximity to endogenous mitochondria.

Other cell types of ocular origin, including human ARPE-19, hCEC, and mouse RGC cells (661W) were able to internalize the exogenous mitochondria, as revealed by increased green fluorescence in flow cytometry following incubation with 1 million MTG stained mitochondria ("1M Mito" in FIG. 4D).

Incubation of hCEC and 661W cells with increasing amounts of mitochondria showed a dose-dependent uptake (FIGS. 5A-5C). These results demonstrate that cells from ocular and neuronal origin have the ability to internalize exogenous mitochondria.

Example 3

In Vitro ATP Production in Mitochondrial Transplanted Cells

Mitochondria were isolated from C5713116 mice livers and their vitality (oxygen consumption, membrane potential) and activity (ATP production) was assessed as described in Example 1 above. The freshly isolated mitochondria were incubated with mouse RGC 661W cell line for 24 h, and ATP produced by these mitochondria-transplanted cell was measured as described in Materials and Methods.

As seen in FIG. 6, mitochondrial uptake by 661W cells lead to increased ATP production in these cells. ATP levels were normalized to cell number (assessed by Neutral Red test) and presented relatively to control cells (i.e., cells not transplanted with exogenous mitochondria). The results were obtained from 5 independent experiments.

Example 4

In Vitro Mitochondrial Uptake Following Oxidative Stress

The therapeutic potential of mitochondrial transplantation against oxidative stress was assessed in vitro in mouse retinal ganglion cells (661W cells). Mitochondria, freshly isolated from C57BL/6 mice livers, were tested for activity and vitality and stained with MTG as described above. Oxidative stress was induced by applying $H_2O_2$. Four groups of 661W cells were tested: (i) cells not incubated with exogenous mitochondria and not treated with $H_2O_2$; (2) cells incubated with exogenous mitochondria for 24 h but not pre-treated with $H_2O_2$; (3) cells not incubated with exogenous mitochondria but treated with $H_2O_2$ for 1 hour; and (4) cells treated with $H_2O_2$ for 1 hour and then incubated with exogenous mitochondria for 24 h. Cells were treated with 0.75 or 1 mM $H_2O_2$. Exogenous mitochondrial uptake was assessed by flow cytometry.

As shown in FIG. 7, oxidative stress significantly enhanced mitochondrial uptake. No cell death was observed (n=2 from 2 independent experiments).

Example 5

In Vivo Retinal Uptake of Isolated Mitochondria

Having demonstrated neuronal uptake of exogenous mitochondria in vitro, the efficiency of exogenous mitochondria entrance into retinal ganglion cells (RGCs) in vivo was next examined. Purified mitochondria ($10^6$-$10^7$) isolated from mouse liver were labeled (stained) with MTR and injected at two concentrations into the vitreous of one eye of each mouse. The contralateral eye was injected with PBS and served as control. Twenty-four hours after mitochondria transplantation, mice were euthanized, and their eyes were enucleated and fixed. Wholemount retina was immunostained for ganglion cells marking by Tuj1 (neuron-specific class III β-tubulin), as described in Materials and Methods.

As shown in FIG. 8A, MTR-stained mitochondria (red) were present in the outer surface of the retina, in a dose-dependent manner. Confocal microscopy and immunostaining confirmed the entry of the transplanted mitochondria into RGCs (FIGS. 8B and 8C). It is noted that these results are the first in vivo demonstrations of the ability to effectively transplant mitochondria into the eye, and more specifically into RGCs.

Example 6

Mitochondrial Uptake by RGCs Following Optic Nerve Crush (ONC)

To evaluate, in vivo, the therapeutic potential of mitochondrial transplantation in retinal ischemic insult, an accepted mouse model of non-arteritic anterior ischemic optic neuropathy (NAION) was used. This model is the most common clinical presentation of acute ischemic damage to the optic nerve. Using this model, the right optic nerve was crushed by applying forceps at 2.5 to 3.0 mm posterior to the globe for 7 seconds; this procedure was repeated three times. Optic nerve crush was immediately followed by a single intravitreal injection of $10^6$-$10^7$ isolated mitochondria stained with MTR. The contralateral (left) eye of each mouse, which was not damaged, was intravitreally injected with MTR-stained mitochondria. Mice were euthanized 24 h following mitochondrial transplantation, the eyes were enucleated and fixed. Wholemount retina were prepared, RGCs were immunostained and/or stained with DAPI as described in Materials and Methods and visualized by a fluorescent microscope. As shown in FIGS. 9A-9B, following ONC, mitochondrial uptake by retinal cells was enhanced.

The retina has a very organized structure with specific layers of cell bodies and fibers (see FIGS. 2A-2B). The inner most (and thinnest) cell layer is the ganglion cell layer (GCL). Paraffin-embedded sections of eyes of the-above-described NAION mice, stained with DAPI, were visualized by fluorescence microscope. As shown in FIG. 10, the injected mitochondria resided in the GCL. The enlarged frames 1 and 2 are zoom-in of the rectangular frames in the middle panel.

Example 7

Mitochondrial Transplantation Protects Retinal Ganglion Cells from Optic Nerve Crush-Induced Cell Death For demonstrating improved RGCs survival following ONC by way of mitochondrial uptake, RGCs were counted in sections of retinae obtained from NAION mice intravitreally injected with purified, $10^7$ isolated mitochondria immediately following ONC. One eye in the optic nerve crushed mouse was injected with mitochondria, and the contraleteal eye was injected with PBS (control). Mice undergoing ONC without concomitant mitochodria injection served as a negative control. Two weeks after injection, eyes were harvested, sectioned and stained with hematoxylin & eosin (H&E) as described in Materials and Methods. Retinal ganglion cells were counted at ×40 magnification field.

Exemplary stained retinal sections are shown in FIGS. 11A-11C, demonstrating loss of RGCs following ONC, but rescue by mitochondria transplantation. The arrows point to the RGCs layer. Quantification of RGCs number in the indicated treatment protocols is presented in FIG. 11D.

Clearly, these results show that mitochondrial transplantation after ONC resulted in reduced number of RGCs death two weeks after injury compared to control.

Example 8

Mitochondrial Transplantation Protects Cells from Oxidative-Stress Induced Cell Death Oxidative stress was used as a model for ischemic injury in order to assess the ability of exogenous mitochondrial uptake to protect cells from ischemic stress-induced cell death. For this purpose, two human cell lines of ocular origin were used: hCEC and ARPE-19. Cells were treated with $H_2O_2$ (hCEC cells with 2.5 µM, ARPE-19 cells with 250 µM $H_2O_2$) for one hour before transplantation with 100,000 mitochondria isolated from ARPE-19 cells. This setting further examined the protective effect of mitochondria both in a syngeneic system (genetically identical, i.e., ARPE-19 mitochondria transplanted in ARPE-19 cells) and allogeneic system (genetically different subjects of the same species, i.e., ARPE-19 cells mitochondria transplanted in hCEC cells). Eighteen hours after transplantation, cell survival was determined by XTT (ARPE-19 cells) or Neutral Red (hCEC cells) assays, both evaluating the number of viable cells.

As shown in FIGS. 12A-12B, mitochondrial transplantation increased survival of both cell types following oxidative stress. This is consistant with several reports demonstrating protective effect of allogeneic mitochondria in various animal models of ischemic injury. Furthermore, mitochondria uptake by hCEC isolated from the limbus of human corneas, suggests that mitochondria can be injected into the limbus for treating conditions where there is limbal stem cell deficiency.

Example 9

Mitochondrial Transplantation Promotes Corneal Wound Healing of Injured Eyes

For inducing alkali corneal injury to the eye, mice were anesthetized by intraperitoneal injection of ketamine (75 mg/g) and domitor (0.75 mg/g). Localin (oxybuprocaine hydrochloride 0.4%) was topically applied and left on the eye for 1 minute. Alkali burns were inflicted in the right eye of mice as follow: Whatman 3 mm filter paper was cut into 5 mm diameter circles, soaked in 0.15 M NaOH for 4-5 seconds, and placed on the eye for 30 seconds. Then, the eye was extensively washed by 5 ml sterile PBS.

For mitochondria transplantation, isolated mitochondria obtained as described in Material and Methods, were diluted in IB-1 buffer and a 25 µl drop was applied to the alkali-injured eye. The drop was replenished every 15 minutes for a total of 3 hours. Finally, dethamycin (dexamethasone 21-phosphate disodium salt, 0.1%) and neomycin sulfate (0.5%) were topically applied to the injured eye. Dethamycin exhibits therapeutic effects, inter alia, against postoperative cataract. Celluspan (hydroxyethylcellulose 1.4%) was applied to non-treated eye to avoid drying. Anesthesia was reversed by subcutaneous injection of antisedan (antipamezole hydrochloride 3.75 mg/g). Mitochondria transplantation was performed daily from the day of injury and for 4 consecutive days. Control mice were treated with IB-1 buffer only and applied the same antibiotics and steroids as the mitochondria transplanted eye.

Every 24 hours mice were anesthetized as described in Materials and Methods, the cornea was stained with 0.1% fluorescein by topical administration and epithelial damage was evaluated using slit-lamp microscopy. The results are shown in FIGS. 13A-13B.

Slit-lamp images and fluorescein staining of alkali injured mouse epithelium is shown in FIG. 13A. As shown in the upper raw of images, alkali injury without treatment is not fully closed after 4 days, whereas eye treated with mitochondria transplantation presented full closer of the injury after 4 days.

Wound size was countrified as the ratio between full eye area and damaged epithelial area (in percentages) from day 1 to day 4. In the eyes of the control group, the damage area closed by 40% in day 4, while in the mitochondria transplanted eyes, the damaged area was 1.5% in day 4. The epithelium wound size closure rate was faster after the addition of mitochondria to the injured eyes compared to the control group P<0.0001 (FIG. 13B).

Four days after injury, corneas were isolated and stained by H&E. The results are shown in FIG. 14A-14B: FIG. 14A shows representative H&E images of corneas harvested 4 days post alkali damage from mice receiving mitochondria transplantation (Mito) or vehicle as control (Control). Arrowhead denotes initial damage location. FIG. 14B shows central corneal thickness as determined from the mean of three measurements at the central region of each cornea histology section. n=3 mice (control); 3 mice (mito). p<0.01 (Student's T-test).

These results have important implications for the development of new treatments for corneal injuries caused by chemical agents like NaOH. The use of mitochondrial transplantation could offer a new and effective approach for promoting faster healing and reducing the risk of complications such as visual impairment.

Example 10

Mitochondrial Transplantation Induces Proliferation and Wound Healing in Human Corneal Epithelial Cells For assessing mitochondria transplantation into primary human corneal epithelial cells, primary human corneal epithelial cells were detached from human corneas and cultured. A scratch in the shape of a cross was performed on confluent cultures. Then, isolated mitochondria obtained from ARPE-19 cells as described in Material and Methods, were diluted in IB-1 buffer and incubated with the corneal epithelial cell cultures. Cultures were imaged and the wound area was measured by ImageJ at time 0, and 24 hours after scratching. The results are shown in FIGS. 15A-15B. Thus, as seen, while the mean percentage of wound closure was 60% in the control group (FIG. 15A, upper panel), mitochondria-transplanted cells demonstrated complete closure of the wound (100%) 24 hours post wounding (FIG. 15B, lower panel).

Primary human epithelial cells with or without mitochondria transplantation, as described above, were stained with antibodies against ki67, a marker for cell proliferation, or incubated with Neutral Red, a dye that is actively absorbed only by living cells. The results are shown in FIGS. 16A-16B. As seen, the percentage of ki67-positive cells was approximately 12% higher in mitochondria-transplanted cells, compared to control (FIG. 16A). Neutral Red uptake was approximately 17% higher, on average, in cells treated with mitochondria, compared to control cells (FIG. 16B).

These results demonstrate that mitochondria transplantation induces proliferation and wound healing in human corneal epithelial cells.

What is claimed is:

1. A method for treatment of damaged epithelium of the cornea in a subject in need thereof, comprising administrating to the subject a therapeutically effective amount of exogenous, isolated mitochondria, thereby treating the damaged epithelium of the cornea in the subject.

2. The method of claim 1, wherein damage to the cornea epithelium is caused by one or more of: a medicament, injury, a corrosive agent, exposure to a chemical or toxin, corneal abrasion, dry eye, a corneal dystrophy involving erosion, a neurotrophic disease causing incomplete lid closure, trichiasis, distichiasis, a restrictive eyelid disease, proptosis/exophthalmos, blepharoplasty, an ultraviolet burn, limbal stem cell deficiency, topical anesthetic abuse, neurotrophic keratopathy and infection.

3. The method of claim 2, wherein the chemical is an alkali.

4. The method of claim 2, wherein the injury is a scratch.

5. The method of claim 1, wherein administration of exogenous, isolated mitochondria is transplantation of exogenous, isolated mitochondria.

6. The method of claim 1, wherein the mitochondria are transplanted via a local or systemic route.

7. The method of claim 6, wherein mitochondrial transplantation is via at least one route selected from topical application, cell-mediated transfer, vesicle-mediated delivery, nanoparticle/polymer mediated delivery, peptide-mediated delivery, or direct injection or microinjection to the eye.

8. The method of claim 7, wherein the mitochondria are administered directly to the eye by topically applying eye drops onto the surface of the eye.

9. The method of claim 1, wherein the mitochondria are freshly isolated mitochondria.

10. The method of claim 1, wherein the isolated mitochondria are autologous, allogeneic, syngeneic or xenogeneic.

11. The method of claim 1, wherein the therapeutically effective amount of mitochondria is in the range of from about $10^4$ to about $10^{10}$ mitochondria.

12. The method of claim 11, wherein the therapeutically effective amount of mitochondria is in the range of from about $10^6$ to about $10^7$ mitochondria.

* * * * *